United States Patent [19]
Yamashita et al.

[11] Patent Number: 5,609,218
[45] Date of Patent: Mar. 11, 1997

[54] TRACTION CONTROL SYSTEM FOR VEHICLES

[75] Inventors: Tetsuhiro Yamashita; Koji Hirai; Masaki Fujii, all of Hiroshima-ken, Japan

[73] Assignee: Mazda Motor Corporation, Hiroshima-ken, Japan

[21] Appl. No.: 427,057

[22] Filed: Apr. 24, 1995

[30] Foreign Application Priority Data

Apr. 22, 1994 [JP] Japan .................................. 6-107571
Apr. 26, 1994 [JP] Japan .................................. 6-112278

[51] Int. Cl.$^6$ ............................................. B60K 28/16
[52] U.S. Cl. ...................... 180/197; 123/417; 364/426.01
[58] Field of Search ...................... 180/197; 364/426.01, 364/426.03, 424.1; 123/416, 417

[56] References Cited

U.S. PATENT DOCUMENTS

| | | | |
|---|---|---|---|
| 5,025,881 | 6/1991 | Poirier et al. | 180/197 |
| 5,224,565 | 7/1993 | Tamura et al. | 180/197 |
| 5,265,693 | 11/1993 | Rees et al. | 180/197 |
| 5,335,744 | 8/1994 | Takasuka et al. | 180/197 |
| 5,463,551 | 10/1995 | Milunas | 180/197 X |
| 5,473,544 | 12/1995 | Yamashita | 364/426.03 |

FOREIGN PATENT DOCUMENTS 3-246335  11/1991  Japan.
5-1613    1/1993   Japan.

*Primary Examiner*—Kevin Hurley
*Attorney, Agent, or Firm*—Fish & Richardson, P.C.

[57] ABSTRACT

A traction control system for an automotive vehicle performs traction control by controlling an engine having an exhaust system with a catalytic converter and a brake system to reduce driving force delivered to driving wheels, so as to diminish excessive slippage of the driving wheels. The traction control system includes a controller for changing an engine control mode from an ordinary control mode to an exhaust temperature reduction mode when a temperature of the catalytic converter is higher than a predetermined temperature and changing a control parameter of engine control, so that the engine provides an increase in output torque in the exhaust temperature reduction mode.

24 Claims, 15 Drawing Sheets

TRACTION CONTROL SYSTEM FOR VEHICLES

BACKGROUND OF THE INVENTION

1. Field of the Invention

This invention relates to a traction control system for a vehicle, and, more particularly, to a traction control system suitable for a vehicle equipped with an exhaust system including a catalytic converter.

2. Description of Related Art

In order for automotive vehicles to prevent deterioration in acceleration performance due to slippage of driving wheels which is caused by excessive driving torque, it is typical to perform traction control where engine output or braking force applied to driving wheels is controlled so that slippage of the driving wheels, which is calculated based on rotational speeds of the driving wheels, reaches a desired or target amount of slippage. In a traction control system of this kind, in order to decrease engine output, the ignition timing may be retarded and/or the fuel supply to specific cylinders may be restricted according to slippage of the driving wheels. Specifically, the engine output is controlled according to control levels which specify engine control patterns each of which defines retardation of ignition timing and/or the number of cylinders for which fuel supply is to be restricted according to slippage of the driving wheels.

In the traction control system of this kind, the retardation of ignition timing causes the engine to increase the amount of unburned ingredients in the exhaust gas and, in addition, provides a tendency to continue what is called an "afterburn" for a relatively long time which leads to an increase in the temperature of the exhaust gas. Additive effects these changes cause make oxidization of the unburned ingredients in the exhaust with the catalyst very active and, as a result, potentially produce a rise in the temperature of the catalytic converter. This deterioration in the exhaust gas purifying performance of the catalytic converter and aggravation of durability of the catalytic converter. Together, the suspension of fuel delivery to only specific cylinders allows unburned ingredients discharged from the remaining cylinders to which fuel has been delivered to be potentially brought into contact with concentrated oxygen in the exhaust from the specific cylinders before reaching the catalytic converter. This contact of the unburned ingredients with oxygen leads to reheating the exhaust and causes the same problems.

Various efforts have been made to eliminate aggravation of performance of the catalytic converter. One such effort is that described in Japanese Laid-Open Patent No. 5-1613. The approach used is to alter an engine control mode from an ordinary control mode to a specific mode, such as an exhaust gas temperature reduction mode, in which the amount of unburned ingredients in the exhaust entering into the catalytic converter is reduced as low as possible when the temperature of a catalytic converter becomes higher than a predetermined temperature. This teaching alludes to generalized techniques for assuring the interruption of retardation of ignition timing when the catalytic converter is at high temperatures, so that the catalytic converter is prevented from suffering an extraordinary rise in temperature, thereby reducing or avoiding aggravation of durability.

While the system as described in Japanese Laid-Open Patent No. 5-1613 may have advantages over the prior art, nevertheless, a certain constraint must be imposed upon the control of engine output. That is, in the exhaust gas temperature reduction mode, in order for the engine to reduce the engine output one step down, the engine output control is performed by means of interrupting fuel delivery instead of retarding ignition timing, resulting in rough changes in engine output. This causes a sharp drop in driving force delivered to driving wheels, giving the driver a feeling of stall.

Further, a temperature sensor for detecting the temperature of the catalytic converter is essential within the system which is not always desirable in terms of costs.

SUMMARY OF THE INVENTION

It is an object of the present invention to provide a traction control system for an automotive vehicle which provides a precise traction control even in the exhaust gas temperature reduction mode.

It is another object of the present invention to provide a traction control system for an automotive vehicle which does not need a temperature sensor for detecting the temperature of a catalytic converter.

The above object of the present invention is achieved by providing a traction control system for an automotive vehicle for performing traction control by controlling an engine having an exhaust system with a catalytic converter and a brake system to reduce driving force delivered to driving wheels so as thereby to diminish excessive slippage of the driving wheels. The system comprises a control means for changing an engine control mode from an ordinary control mode to an exhaust temperature reduction mode when the temperature of the catalytic converter is higher than a predetermined temperature and changing an engine control parameter so that the engine provides an engine output torque increased higher for a specific driving condition in the exhaust temperature reduction mode as compared with for the specific driving condition in the ordinary mode. In the traction control system, the temperature of the catalytic converter is estimated based on the engine driving condition, such as the speed of engine, the temperature of engine and the octane value of gasoline used.

In this instance, the engine control parameter may be directly, or otherwise indirectly, changed so as to provide an increase in engine output. Further, the engine control parameter may be changed by increasing a target value of control when in the exhaust temperature reduction mode. Alternatively, the engine control parameter may be changed by shifting up the automatic transmission when the traction control is performed in the exhaust temperature reduction mode.

In the case where the traction control is performed by means of controlling braking in addition to the engine output control, the control means may decrease a target braking force when the traction control is performed in the exhaust temperature reduction mode.

According to another embodiment, the traction control system comprises a control means for changing an engine control mode from an ordinary control mode to an exhaust temperature reduction mode when the temperature detection means detects a temperature higher than a predetermined temperature, and changing a control gain of engine control so that the engine provides an output torque increased for a specific driving condition in the exhaust temperature reduction mode as compared with for the specific driving condition in the ordinary mode, thereby reducing the driving force.

According to still another embodiment, the traction control system comprises a control means for changing an engine control mode from an ordinary control mode to an exhaust temperature reduction mode when the temperature detection means detects a temperature higher than a predetermined temperature and changing a control parameter of engine control so that the engine provides an output torque decreased for a specific driving condition in the exhaust temperature reduction mode as compared with for the specific driving condition in the ordinary mode, thereby reducing the driving force.

Changing the engine controlling mode to the exhaust temperature reduction mode provides a great reduction in the amount of unburned ingredients in the exhaust entering into the catalytic converter, preventing the catalytic converter from suffering an extraordinary rise in temperature. The engine control parameter is changed so as to provide an increase in engine output which is larger in the exhaust temperature reduction mode than in the ordinary mode, assuring a necessary driving force and, as a result, preventing the driver have a feeling of stall. Otherwise, in the case where the target braking force is decreased when the traction control takes place in the exhaust temperature reduction mode, the engine control provides an increase in engine output equivalent to the reduction in driving-force due to braking. This also prevents the driver from having a feeling of stall. Alternatively, in the case where the automatic transmission is shifted up when the traction control takes place in the exhaust temperature reduction mode, the engine control parameter changes so as to provide an increase in engine output in the exhaust temperature reduction mode due to diminished slippage of the driving wheels, thereby preventing the driver from having a feeling of stall.

Increasing the gain of engine control provides changes at frequent intervals, so as to exclude changes in wheel speed, thereby improving the performance of traction control.

In the case where the engine control parameter is changed so as to provide a reduction in engine output which is larger in the exhaust temperature reduction mode than in the ordinary mode, the output of engine is further reduced in the exhaust temperature reduction mode, assuring the stability of traction control.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numbers have been used to denote the same or similar parts or elements throughout the drawings, and in which.

DETAILED DESCRIPTION OF THE PREFERRED EMBODIMENTS

Figure 1:
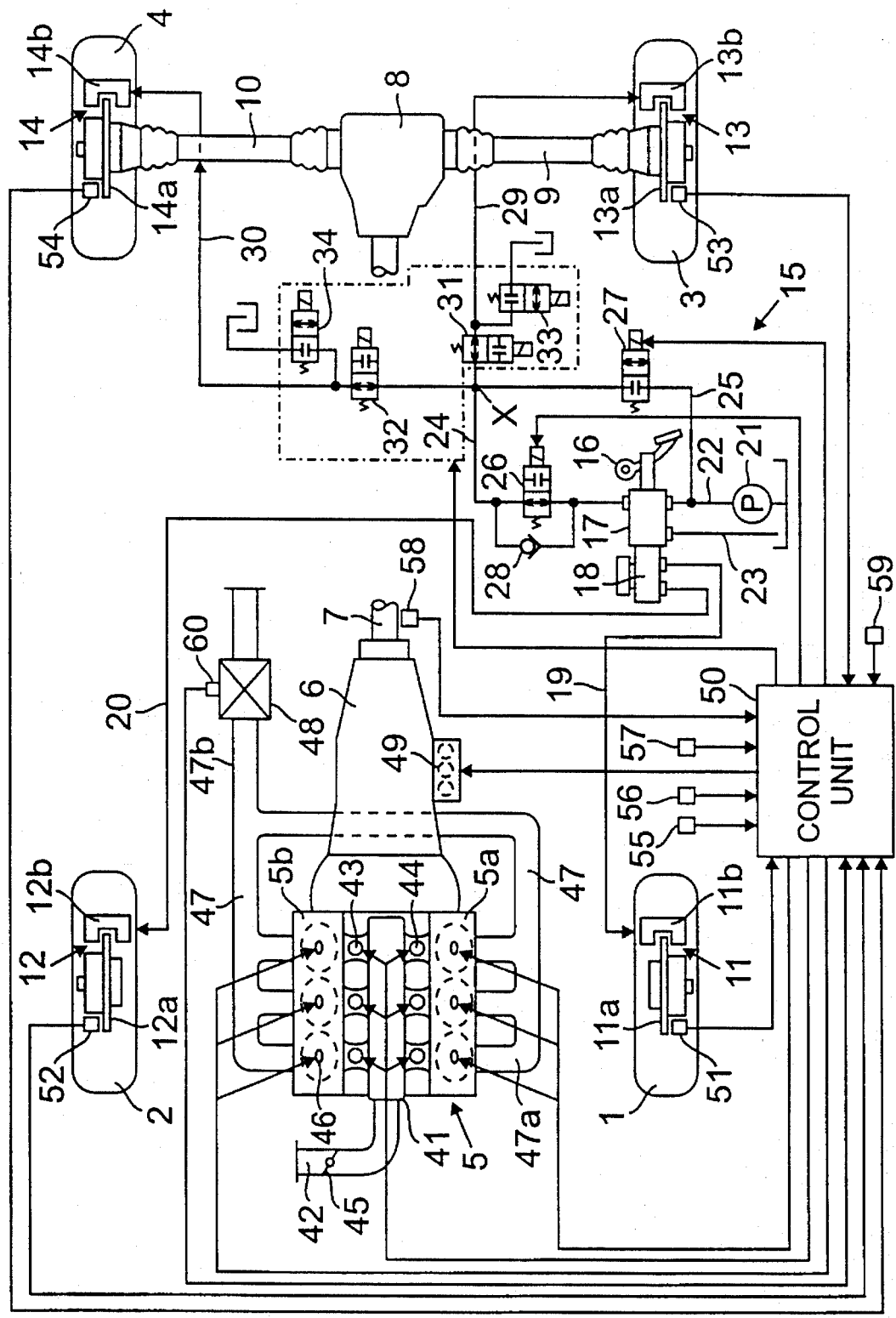
FIG. 1 is a schematic illustration of a rear wheel drive automotive vehicle incorporating a traction control system in accordance with a preferred embodiment of the present invention.

Referring now to the drawings in detail, and in particular, to FIG. 1, a rear wheel drive type of automotive vehicle equipped with a traction control system in accordance with a preferred embodiment of the present invention has front wheels 1 and 2 as driven wheels and rear wheels 3 and 4 as driving wheels. Engine output from an engine 5 is connected to the rear wheels 3 and 4 through rear axles 9 and 10, respectively, via, from the front to the rear, an automatic transmission 6, a propeller shaft 7 and a differential gear 8. The engine 5 is a V-type six-cylinder internal combustion engine having left and right cylinder banks 5a and 5b arranged in a V-formation with a predetermined relative angle. Above the engine 5 between the left and right banks, there is placed a surge tank 41 connected to an intake pipe 42. The surge tank 41 is provided with six discrete intake pipes 43. Each discrete intake pipe 43, which may be formed integrally with, or separately formed from and attached to, the surge tank 41, extends from one side of the surge tank 41 to another side so as to be connected to an intake port of one of the cylinders in one of the banks remote from the one side of the surge tank 41. The discrete intake pipes 43 are provided with fuel injectors 44. Each fuel injector 14 is positioned so as to inject fuel into either the discrete intake pipe 43 or the related intake port (not shown). The intake pipe 42 is provided with a throttle valve 45 operationally coupled to an accelerator pedal (not shown). The engine is further provided with an ignition plug 46 for each cylinder.

An exhaust pipe 47 has discrete exhaust pipes 47a branching off therefrom for connecting the exhaust pipe 47 with the cylinders of each cylinder bank 5a, 5b, respectively. These exhaust pipes 47 join together as an exhaust pipe extension where a catalytic converter 48 is disposed.

A braking system 15 of the automotive vehicle includes brake units 11, 12, 13 and 14 cooperating with the front and rear wheels 1, 2, 3 and 4, respectively. Each brake unit 11, 11, 13 or 14 includes a brake disk 11a, 12a, 13a or 14a rotatable together with the wheel 1, 2, 3 or 4 as one unit and a brake caliper 11b, 12b, 13b or 14b which is hydraulically actuated with a brake oil so as to control the brake disk 11a, 12a, 13a or 14a. Each of these brake units 11–14 cooperates with a pressure booster 17 which boosts pressure of the brake oil according to depression of a brake pedal 16. A master cylinder 18, to which the boosted brake oil is delivered, is connected to the calipers 11b and 12b of the front brake units 11 and 12 through front wheel pressure lines 19 and 20, respectively, which extend separately from the master cylinder 18.

The pressure booster 17 has a pressure line 22 connected to a pump 21 for delivering a pressurized brake oil to the booster 17 from a reservoir tank and an oil pipe 23 through which excess brake oil returns from the booster 17 to the reservoir tank. A first control pressure line 24 extending from the pressure booster 17 and a second control pressure line 25 branching off from the pressure line 22 are provided with first and second electromagnetic valves 26 and 27 respectively. A back flow check valve 28 is provided in parallel with the first electromagnetic valve 26. These control pressure lines 24 and 25 join once at a point X and separate from each other as rear wheel control pressure lines 29 and 30 connected to the calipers 13b and 14b of the rear wheel brake units 13 and 14. The rear wheel control pressure line 29 is provided with an electromagnetic valve 31 and a relief valve 33. Similarly, the rear wheel control pressure line 30 is provided with an electromagnetic valve 32 and a relief valve 34.

In this instance, in the condition where the valves 26, 29 and 30 are opened and the valve 27 is closed, the pressure magnified by the pressure booster 17 is delivered to the brake units 13 and 14 for the rear wheels 3 and 4 through the first control pressure line 24 and braking the rear wheels 3 and 4.

The traction control system includes an electronic control unit 50, such as a microcomputer, to which various signals are transmitted from various sensors and switches. These sensors and switches include speed sensors 51, 52, 53 and 54 for detecting speeds of the wheels 1, 2, 3 and 4, respectively, an air flow sensor 55 for detecting an intake air flow rate, a position sensor 56 for detecting the position or opening of the throttle valve 45, a speed sensor 57 for an engine speed, a speed sensor 58 for detecting a vehicle speed, a temperature sensor 59 for detecting the temperature of engine coolant, a temperature sensor 60 for detecting the temperature of catalyst of the catalytic converter 48.

In order to perform the traction control in an engine control mode and a brake control mode, the electronic control unit 50 determines an eventual ignition timing at which a fuel mixture is fired based on engine speed and intake air flow rate. Specifically, the electronic control unit 50 searches an ignition timing map in which ignition timings are defined according to engine speed and intake air flow rate as parameters and determines an ignition timing based on an engine speed Ne and an intake air flow rate Q detected by the sensors 57 and 55. The basic ignition time is corrected as an eventual ignition time according to the temperature of engine coolant detected by the temperature sensor 59. Together, the electronic control unit 50 determines a basic amount of fuel to be delivered into the cylinder based on engine speed Ne and intake air flow rate Q. The basic amount of fuel is corrected as an eventual amount of fuel according to the temperature of engine coolant detected by the temperature sensor 59. On the other hand, the electronic control unit 50 determines gears of the transmission 6 suitable for a specific driving condition based on throttle opening θ and vehicle speed Vr. Specifically, the electronic control unit 50 searches a gear shift map defined according to throttle opening θ and vehicle speed Vr as parameters and determines a gear suitable for the driving condition based on an throttle opening θ and a vehicle speed Vr detected by the sensors 56 and 58.

In the traction control which the control unit 50 performs, the smaller wheel speed of the two front wheels 1 and 2 is selected as a vehicle speed Vr. A vehicle acceleration Va is calculated based on a change in the vehicle speed Vr. A road friction coefficient μ is determined with regard to these vehicle speed Vr and vehicle acceleration Va thus obtained by looking up a road friction coefficient table (I) such as shown in table (I) below.

TABLE (I)

| ROAD FRICTION COEFFICIENT TABLE | | | | | | | | |
|---|---|---|---|---|---|---|---|---|
| | 0 | | | Va | | | Large | |
| 0 | 1 | 1 | 2 | 2 | 3 | 3 | 4 | 4 | 5 |
| | 1 | 1 | 2 | 2 | 3 | 4 | 4 | 5 | 5 |
| | 1 | 1 | 2 | 3 | 3 | 4 | 4 | 5 | 5 |
| Vr | 1 | 1 | 2 | 3 | 4 | 4 | 5 | 5 | 5 |
| | 1 | 1 | 2 | 3 | 4 | 5 | 5 | 5 | 5 |
| | 1 | 1 | 2 | 4 | 4 | 5 | 5 | 5 | 5 |
| | 1 | 2 | 3 | 4 | 5 | 5 | 5 | 5 | 5 |
| Large | 1 | 2 | 3 | 5 | 5 | 5 | 5 | 5 | 5 |

As is apparent from the road friction coefficient table (I), the larger the vehicle speed Vr and/or the vehicle acceleration Va is, the larger the road friction coefficient μ is set. This road friction coefficient μ is used to determine threshold slippage Ss and Se for the judgement of commencement and termination of the traction control, respectively, from a threshold slippage map defined using the road friction coefficient μ and the vehicle speed Vr as parameters. In this instance the threshold slippage for the judgement of traction control termination (which is hereafter referred to as the traction control termination threshold slippage) is set higher than that for the judgement of traction control commencement (which is hereafter referred to as the traction control commencement threshold slippage). Thereafter, slippage S of each rear driving wheel 3, 4 is calculated as a difference in speed of the rear driving wheel 3, 4 from the vehicle speed Vr. On the other hand, either one of these slippage S which is larger than the other is taken as the largest slippage Shi. Further, arithmetic mean slippage Sav of these slippage S of the rear driving wheels 3 and 4 is calculated. When the largest slippage Shi has reached the traction control commencement threshold slippage Ss, it is judged that the rear driving wheels 3 and 4 are slipping and then, a slippage flag Fs is set to a state of 1 (one). On the other hand, when the largest slippage Shi has decreased below the traction control commencement threshold slippage Se, it is judged that the rear driving wheels 3 and 4 are free from slipping and then, the slippage flag Fs is reset to a state of 0 (zero).

In the traction control in the engine control mode, basic target slippage Teo for engine control is found from a basic target slippage table defined according to vehicle speed Vr and road friction coefficient μ as parameters. An eventual target slippage Te for engine control is calculated from the following equation (1):

$$Te = Teo \cdot K1 \tag{1}$$

where K1 is the target slippage correction coefficient which is 1 (one) in ordinary driving conditions.

Thereafter, calculations are made to obtain a slippage difference $\Delta Se$ of the mean slippage Sav from the eventual target slippage Te and a change DSe in the slippage difference $\Delta Se$ between a latest control sequence (i) and the preceding control sequence (i–1) from the following equations (2) and (3):

$$\Delta Se = Sav - Te \tag{2}$$

$$Dse = \Delta Se(i) - \Delta Se(i-1) \tag{3}$$

Based on these slippage difference $\Delta Se$ and slippage difference change Dse thus calculated, an appropriate basic control level is found from a basic control level table defined according to slippage difference $\Delta Se$ and slippage difference change Dse as parameters as shown in table (II).

TABLE (II)

BASIC CONTROL LEVEL TABLE

|  | (−) |  | Dse |  |  |  | (+) |
|---|---|---|---|---|---|---|---|
| (−) | −3 | −2 | −1 | −1 | 0 | +1 | +1 |
|  | −3 | −1 | −1 | 0 | 0 | +1 | +1 |
|  | −2 | −1 | −1 | 0 | 0 | +1 | +1 |
| $\Delta Se$ | −2 | −1 | 0 | 0 | +1 | +1 | +1 |
|  | −2 | −1 | 0 | 0 | +1 | +1 | +2 |
|  | −1 | −1 | 0 | 0 | +1 | +1 | +2 |
|  | −1 | 0 | 0 | 0 | +1 | +1 | +2 |
|  | −1 | 0 | 0 | 0 | +1 | +1 | +3 |
| (+) | −1 | 0 | 0 | 0 | +1 | +2 | +3 |

From the following equation (4), an eventual control level EL is determined according to the basic control level L.

$$EL(j) = EL(j-1) + L \cdot G \tag{4}$$

where G is the control gain which takes 1 (one) in ordinary driving conditions.

With reference to the eventual control level, an engine control pattern is determined from a basic control pattern table which defines eleven engine control patterns as shown in table (III) below.

TABLE (III)

BASIC CONTROL PATTERN TABLE

|  | Cylinder No. |  |  |  |  |  |  |
|---|---|---|---|---|---|---|---|
| EL(i) | 1 | 2 | 3 | 4 | 5 | 6 | Retardation |
| 1 |   |   |   |   |   |   | 5° |
| 2 |   |   |   |   |   |   | 15° |
| 3 | x | x |   |   |   |   |  |
| 4 | x | x |   |   |   |   |  |
| 5 | x | x |   |   |   |   | 10° |
| 6 | x | x | x |   |   |   |  |
| 7 | x | x | x |   |   |   | 10° |
| 8 | x | x | x | x |   |   |  |
| 9 | x | x | x | x |   |   | 10° |
| 10 | x | x | x | x | x |   |  |
| 11 | x | x | x | x | x | x |  |

In the engine control pattern table, the cylinder indicated by a sign x is under interruption in fuel delivery. Specifically describing, the engine control pattern designated by the eventual control level 1, fuel is delivered to all of the six cylinders. In the engine control pattern designated by, for instance, the control levels 6 and 7, fuel is delivered to No. 4 to No. 6 cylinders only.

In the engine control pattern designated by, for instance, the control level 11, fuel is not delivered to any one of No. 1 to No. 6 cylinders. Further, in the engine control patterns designated by the control levels 1, 2, 5, 7 and 9, fuel ignition is retarded by angles indicated in the table. As apparent, as the eventual engine control level EL becomes larger, the number of cylinders to which fuel delivery is suspended increases so as to diminish the engine output. Together, a retardation of fuel ignition timing decreases the engine output in different engine control patterns in which the same number of cylinders is suspended from fuel delivery.

In addition, an engine control pattern table such as shown in table (IV) is alternatively used according to catalyst temperatures detected by the temperature sensor 60.

TABLE (IV)

ENGINE CONTROL PATTERN TABLE

|  | Cylinder No. |  |  |  |  |  |
|---|---|---|---|---|---|---|
| EL(i) | 1 | 2 | 3 | 4 | 5 | 6 |
| 1 | x | x |   |   |   |   |
| 2 |   |   |   |   |   |   |
| 3 | x | x |   |   |   |   |
| 4 | x | x |   |   |   |   |
| 5 | x | x |   |   |   |   |
| 6 | x | x | x |   |   |   |
| 7 | x | x | x |   |   |   |
| 8 | x | x | x | x |   |   |
| 9 | x | x | x | x |   |   |
| 10 | x | x | x | x | x |   |
| 11 | x | x | x | x | x | x |

Specifically, the basic control pattern table shown in Table (III) is used to select basic engine control patterns when the temperature of catalyst is lower than a predetermined temperature. When the basic control pattern table (III) is used, a mode flag Fm is reset to a state of 0 (zero) which indicates an ordinary mode. On the other hand, the engine control pattern table shown in table (IV) causing a decrease in exhaust is used to select engine control patterns when the temperature of catalyst is higher than the predetermined temperature. When the engine control pattern table (IV) is used, the mode flag Fm is set to a state of 1 which indicates an exhaust temperature reduction mode.

In the traction control in the brake control mode, when a driving condition for the traction control develops, the first electromagnetic valve 26 is closed and, on the other hand, the second electromagnetic valve 26 is opened. As a result, the pressure caused by the pump 21 is delivered as a control pressure into the rear wheel control pressure lines 29 and 30, bypassing through the pressure booster 17.

Subsequently, based on the vehicle speed Vr and the road friction coefficient μ, basic target slippage Tbo for brake control is found from a basic target slippage table defined using the vehicle speed Vr and the road friction coefficient μ as parameters. An eventual target slippage Tb for brake control is calculated from the following equation (5):

$$Tb = Tbo \cdot K2 \tag{5}$$

where K2 is the target slippage correction coefficient which is 1 (one) in ordinary driving conditions. In this instance, the eventual target slippage Tb for brake control is set larger than the eventual target slippage Te for engine control.

Accordingly, in the ordinary driving mode where the mode flag Fm has been reset, the eventual target slippage Tb is larger than the eventual target slippage Te.

Thereafter, calculations are made to obtain a slippage difference ΔSb of the slippage Sav of the rear driving wheels 3 and 4 from the eventual target slippage Tb and a change DSb in the slippage difference ΔSb between a latest control sequence (i) and the preceding control sequence (i−1) from the following equations (6) and (7):

$$\Delta Sb = S - Tb \quad (6)$$

$$Dsb = \Delta Sb(i) - \Delta Sb(i-1) \quad (7)$$

Based on these slippage difference ΔSb and slippage difference change Dsb thus calculated, an appropriate control level, which defines braking pressure, is found from a control level table defined using the slippage difference ΔSb and the slippage difference change Dsb as parameters, as shown in table (V).

TABLE (V)

BASIC CONTROL LEVEL TABLE

|  | (−) |  |  | Dsb 0 |  |  | (+) |
|---|---|---|---|---|---|---|---|
| (−) | NB | NB | NB | NB | NM | ZO | ZO |
|  | NM | NM | NM | NM | NS | ZO | ZO |
|  | NM | NM | NM | NS | ZO | ZO | ZO |
| ΔSb 0 | NS | NA | NS | ZO | ZO | ZO | ZO |
|  | ZO | ZO | ZO | ZO | PS | PS | PS |
|  | ZO | ZO | PS | PM | PM | PM | PM |
|  | ZO | ZO | PM | PB | PB | PB | PB |

In the table (V), the label ZO indicates maintaining the control pressure; the label N indicates reducing the control pressure; the label P indicates increasing the control pressure; and the labels S,M and B indicate weak braking force, moderate braking force and strong braking force, respectively. Specifically, when the control label PB is selected, the electromagnetic valves 31 and 32 are driven by the strongest force, so as to increase the braking force of the rear wheel brake units 13 and 14 rapidly. When the control label NB is selected, the relief valves 33 and 34 are driven by the strongest force, so as to decrease the control pressure to the rear wheel brake units 13 and 14 rapidly.

Figure 2:
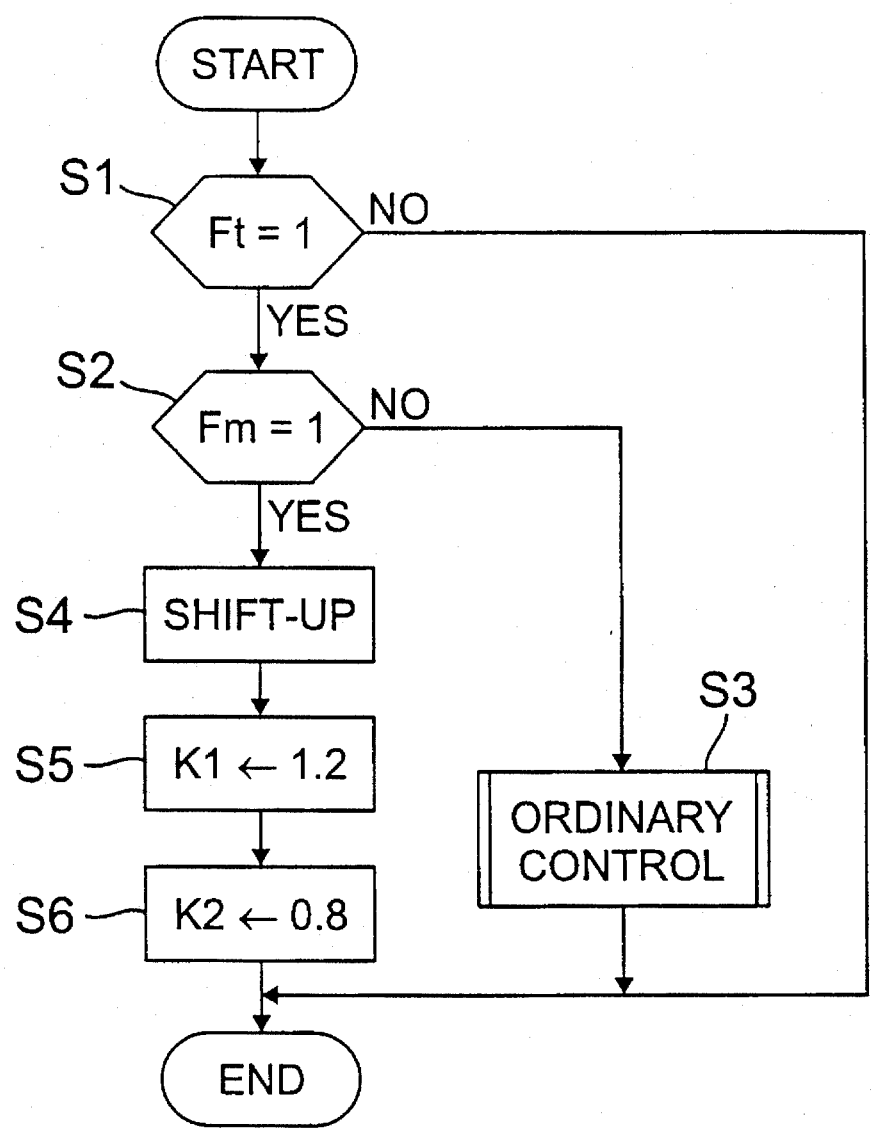
FIG. 2 is a flow chart illustrating a routine of traction control by engine control.

The operation of the control unit 50 for traction control will be best understood by referring FIG. 2, which is a flow chart illustrating a traction control routine in the engine control mode for the microcomputer. Programming a computer is a skill well understood in the art. The following description is written to enable a programmer having ordinary skill in the art to prepare an appropriate program for the microcomputer. The particular details of any such program would of course depend upon the architecture of the particular computers selected.

Referring now to FIG. 2, which is a flow chart of the traction control sequence routine in the engine control mode which is executed with short intervals, the traction control routine commences and control passes directly to a function block at step S1 where a decision is made as to whether a traction control flag Ft has been set to a state of 1 (one) which indicates that the traction control is under execution. If the answer to the decision is "YES," then another decision is made at step S2 as to whether the mode flag Fm has been set to the state of 1 (one) which indicates the exhaust temperature reduction mode. If the answer to the decision is "NO" this indicates that the traction control is in the ordinary control mode, then, ordinary engine control is executed at step S3.

On the other hand, if the answer to the decision made at step S2 is "YES," after having forced the automatic transmission 6 shift up at step S4, the target slippage correction coefficient K1 for engine control is set to 1.2 at step S5 and the target slippage correction coefficient K2 for brake control is subsequently set to 0.8 at step S6. This results in, on one hand, an increase in the eventual target slippage Te for engine control obtained from the equation (1) and on the other hand, a decrease in the eventual target slippage Tb for brake control.

Figure 3:
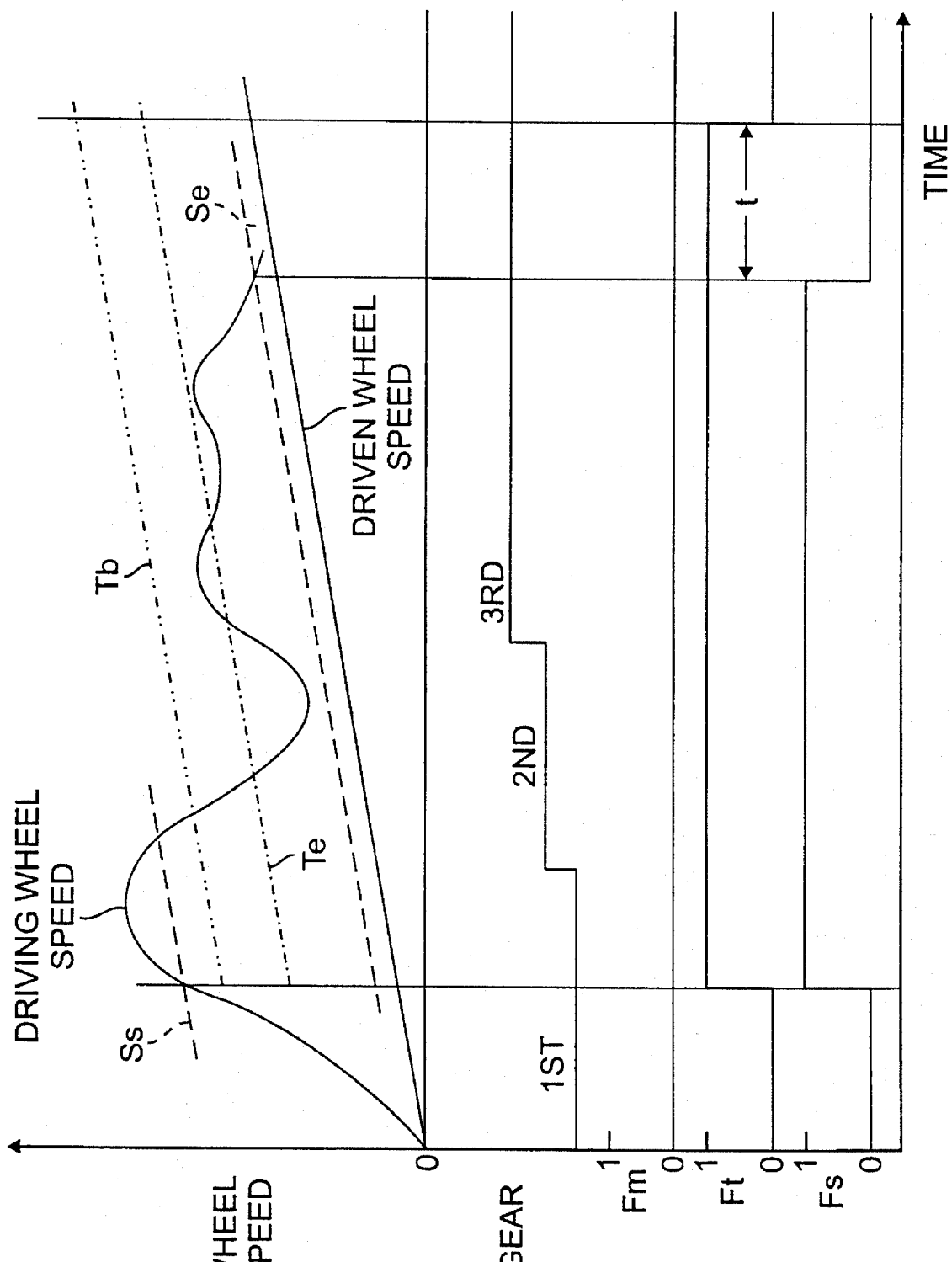
FIG. 3 is a time chart illustrating the traction control in an ordinary mode.

FIG. 3 shows the operation of the traction control system according to the sequence routine in the engine control mode shown in FIG. 2. When the largest slippage Shi of the rear driving wheels 3 and 4 reaches or exceeds the traction control commencement threshold slippage Ss for the first time, after setting the slippage flag Fs, the traction control is commenced in a combined control mode in which engine control and brake control are simultaneously executed. At this time, the traction control flag Ft is set. When the driving wheel speed is higher than a speed which specifies the eventual target slippage Tb for brake control, the traction control is executed in the combined control mode. As a result, spin is rapidly diminished. When the driving wheel speed becomes lower than the speed for the eventual target slippage Tb for brake control after having reached a peak speed, the traction control is put under engine control, the engine output is feedback controlled so as to force slippage to reach the eventual target slippage Te. In such an event, since the basic control pattern table (III) is selected in the ordinary control mode, the engine output control is performed precisely by means of the suspension of fuel delivery and the retardation of fuel ignition timing in combination in any one of the eleven control patterns.

Further, when the largest slippage Shi of the rear driving wheels 3 and 4 reduces below the traction control commencement threshold slippage Se, the slippage flag Fs is reset down. Then, after a lapse of a predetermined amount of time t from when the slippage flag F is reset, the traction control flag Ft is reset so as to terminate the traction control.

Figure 4:
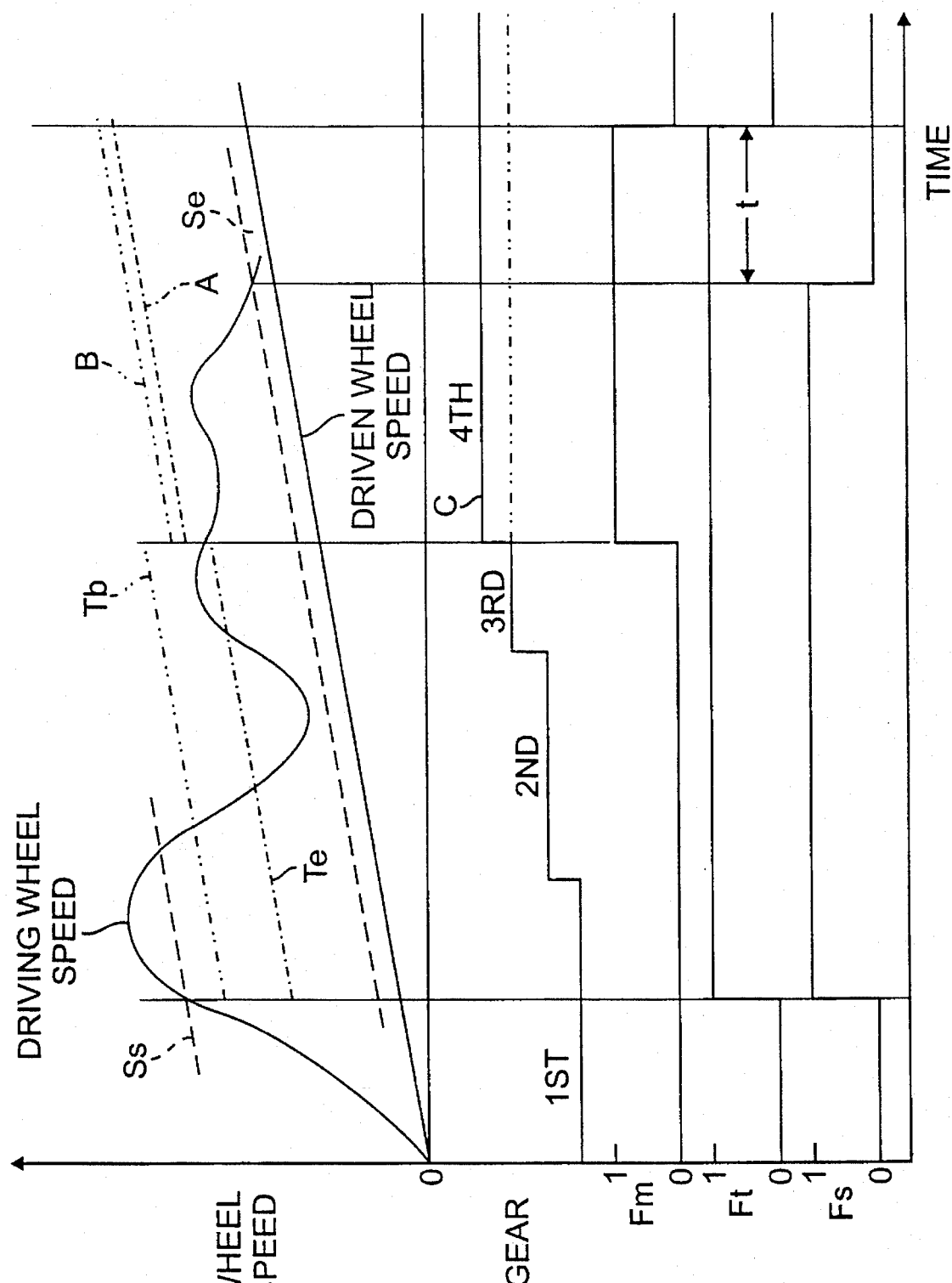
FIG. 4 is a time chart illustrating the traction control.

On the other hand, as a result of a rise in the temperature of the above a predetermined temperatures the traction control potentially changes from the ordinary control mode to the exhaust temperature reduction mode. In such an event, as shown in FIG. 4, at a time the mode flag Fm is changed from the state of 0 (zero) to the state of 1 (one), the eventual target slippage Te for engine control is increased as shown by a reference character A. At the same time, the eventual target slippage Tb for brake control is decreased as shown by a reference character B. Together, the engine control is performed based on engine control patterns defined in the engine control pattern table (IV) for exhaust temperature reduction in which any ignition timing retardation is not made. Because two cylinders are suspended from fuel delivery even in the engine control patterns defined by the engine control levels "1" and "2" the amount of unburned ingredients in the exhaust entering into the catalytic converter 48 per unit time is significantly reduced. As a result, oxidization of the unburned ingredients in the exhaust with the catalyst is suppressed, preventing the catalytic converter 48 from suffering an extraordinary rise in temperature. In this instance, since the eventual target slippage Te for engine control is increased, the engine 5 provides increased output torque, preventing a deficiency of driving force. This prevents the driver from having a feeling like an engine stall. In addition, since the eventual target slippage Tb for brake control is decreased, the engine is controlled to provide an increase in output torque so as to compensate for decrease in driving force caused due by to braking. This also does not present a feeling of engine stall to the driver. In addition, as shown by a reference character C in FIG. 4, the automatic transmission is compelled to shift up, for instance to a forth gear from third gear at a time the mode flag Fm is set up. This gear shift up reduces slippage of the rear driving wheels 3 and 4, so as to cause the engine 5 to provide an increase in output torque, thereby preventing more securely the driver from having a feeling of engine stall.

Figure 5:
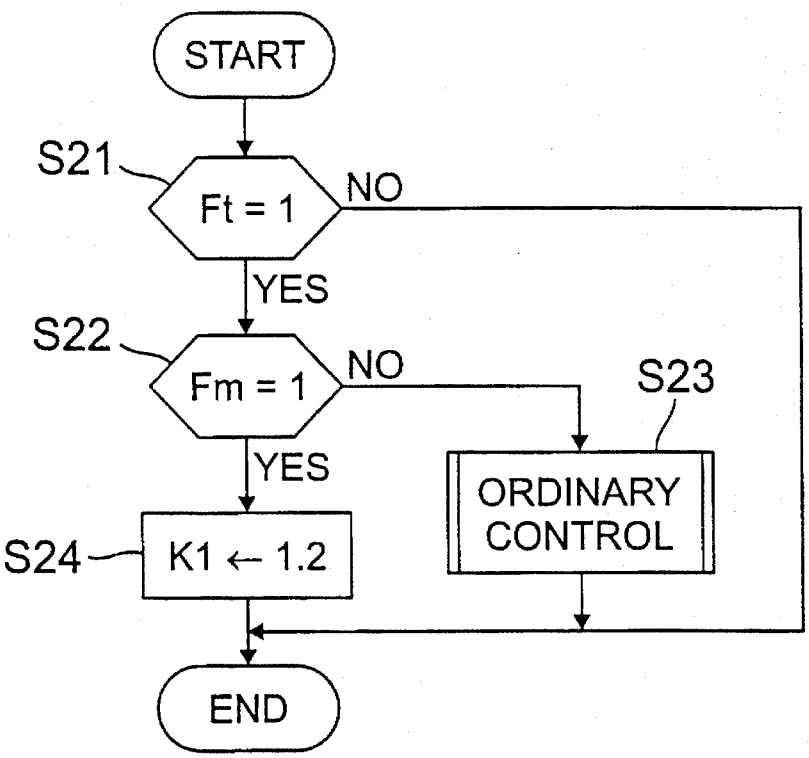
FIG. 5 is a flow chart illustrating a variation of the routine of traction control by engine control.

The traction control routine may be changed as shown in FIG. 5. If the answer to the decision made concerning the control mode flag Fm is "YES" during the traction control, this indicates that the traction control is in the exhaust temperature reduction mode, then, the target slippage correction coefficient K1 for engine control is set to 1.2 at step S24. This results in an increase in the eventual target slippage Te for engine control obtained from the equation (1). If the answer to the decision is "NO" this indicates that the traction control is in the ordinary control mode, then, the ordinary engine control is executed at step S23.

In this embodiment, if the temperature of catalytic converter is lower than the predetermined temperature, the traction control is performed by controlling the engine in the ordinary control mode and, consequently, the basic control pattern table (III) is selected. As a result, the engine output control is performed precisely by means of the suspension of fuel delivery and the retardation of fuel ignition timing in combination in any one of the eleven control patterns. On the other hand, if the temperature of the catalytic converter rises up over the predetermined temperature and, as a result, the traction control changes from the ordinary control mode to the exhaust temperature reduction mode, the engine control pattern table (IV) for exhaust temperature reduction is selected. Because, in this exhaust temperature reduction mode, the traction control is performed without retarding the ignition timing but with suspending fuel delivery to specific cylinders, the amount of unburned ingredients in the exhaust entering into the catalytic converter 48 per unit time is significantly reduced. As a result, the catalytic converter 48 is prevented from suffering an extraordinary rise in temperature. In this instance, because of an increased eventual target slippage Te for engine control, the engine 5 provides increased output torque, preventing a deficiency of driving force. This prevents the driver from having a feeling of engine stall.

Figure 6:
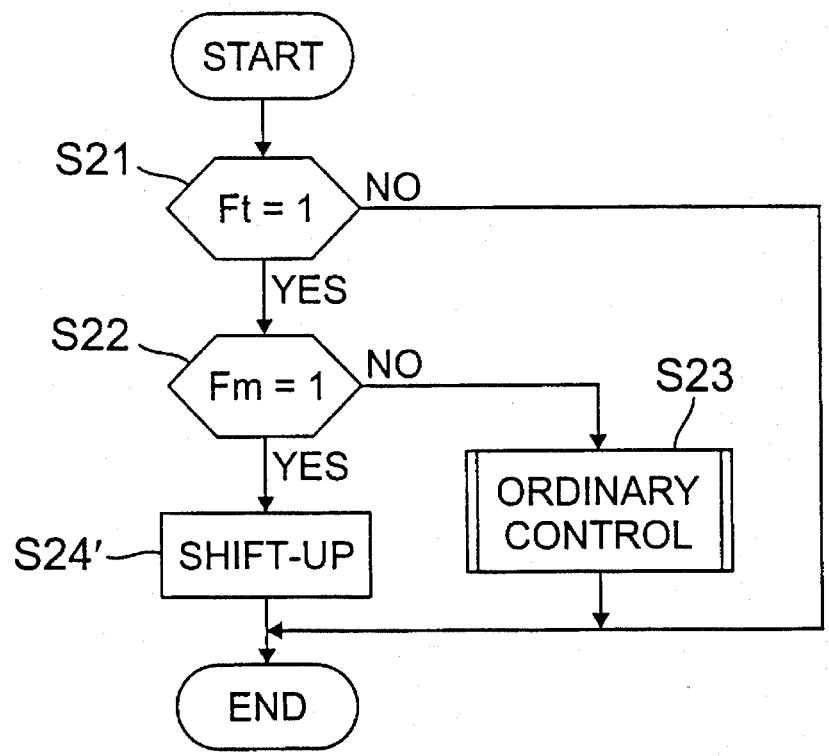
FIG. 6 is a flow chart illustrating another variation of the routine of traction control by engine control.

In the traction control routine, in place of changing the target slippage correction coefficient K1 for engine control to 1.2, shifting up the automatic transmission may take place. As shown in FIG. 6, if the traction control is performed in the exhaust temperature reduction mode, the automatic transmission is forced to shift up at step S24'. This results in a decrease in the eventual target slippage Te for engine control, allowing the engine to increase output torque without giving the driver a feeling of engine stall.

Figure 7:
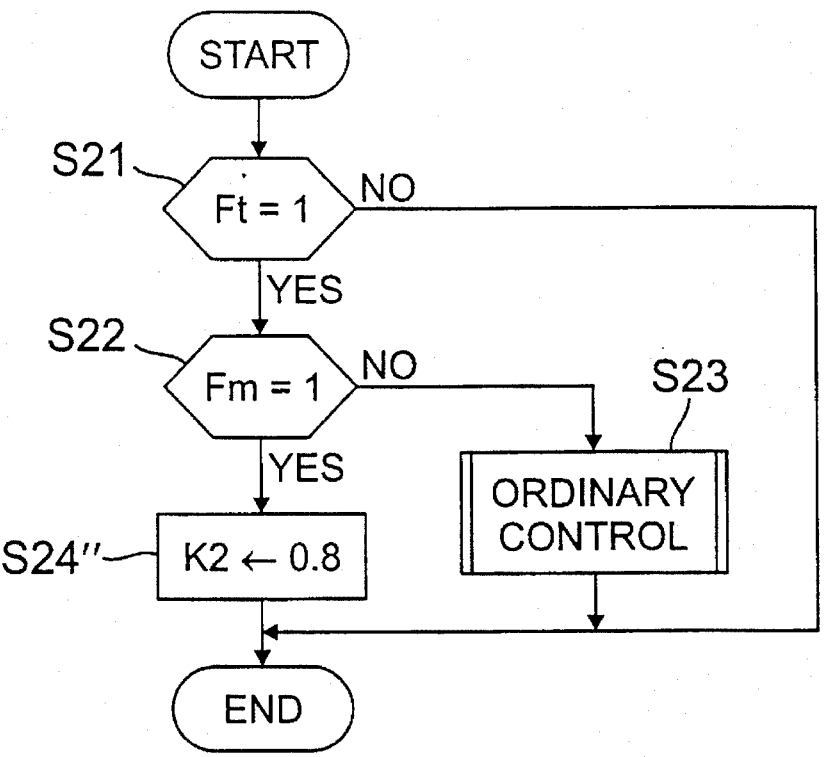
FIG. 7 is a flow chart illustrating still another variation of the routine of traction control by engine control.

The traction control routine may be further changed as shown in FIG. 7. If the traction control is performed in the exhaust temperature reduction mode, the target slippage correction coefficient K2 for brake control is set to 0.8 at step S24". This results in a decrease in the eventual target slippage Tb for brake control, controlling the engine to provide an increase in output torque so as to compensate a decrease in driving force caused due to braking. This prevents the driver from having a feeling of engine stall.

Figure 8:
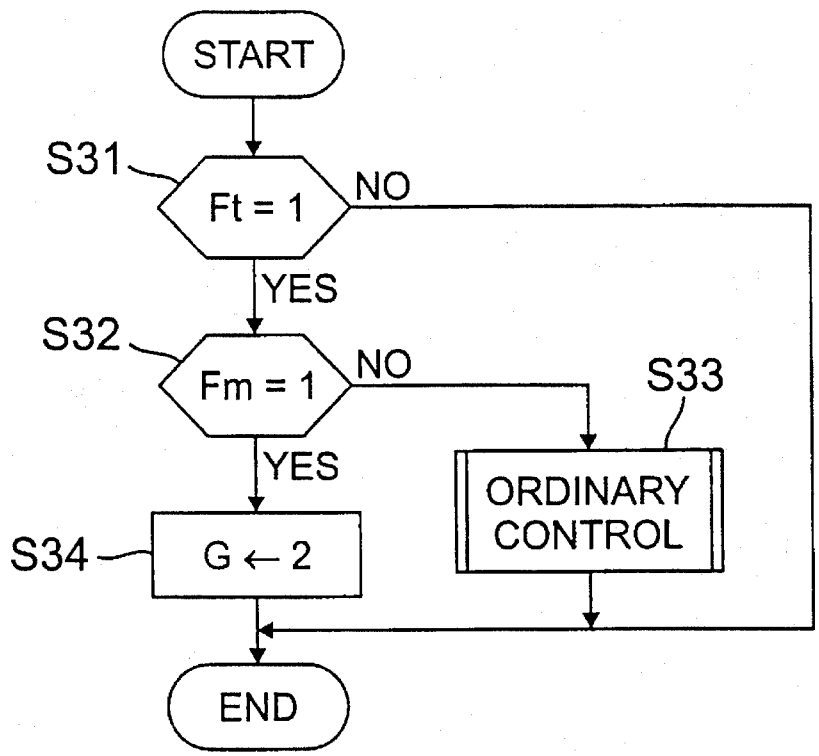
FIG. 8 is a flow chart illustrating a further variation of the routine of traction control by engine control.

FIG. 8 shows a flow chart of a version of the traction control sequence routine. The traction control routine commences and control passes directly to a function block at step S31 where a decision is made as to whether the traction control flag Ft has been set. If the answer to the decision is "YES," then another decision is made at step S32 as to whether the control mode flag Fm has been set. If the answer to the decision is "NO" this indicates that the traction control is in the ordinary control mode, and ordinary engine control is executed at step S33. On the other hand, if the answer to the decision made at step S32 is "YES," the control gain G is set to "2" at step S34. This leads to increasingly or decreasingly changing the eventual engine control level EL at frequent intervals.

In this instance, when, as a result of a rise in the temperature of catalyst above the predetermined temperature, the traction control changes from the ordinary control mode to the exhaust temperature reduction mode, the engine control pattern table (IV) for exhaust temperature reduction is selected. Because, in this exhaust temperature reduction mode, the traction control is performed with both retarding the ignition timing and suspending fuel delivery to specific cylinders, the amount of unburned ingredients in the exhaust entering into the catalytic converter 48 per unit time is significantly reduced and, as a result, the catalytic converter 48 is prevented from suffering an extraordinary rise in temperature. During the traction control, the eventual engine control level EL increasingly or decreasingly changes at frequent intervals, providing changes in engine output at frequent intervals. This results in excellent traction control without changes in wheel speed.

Figure 9:
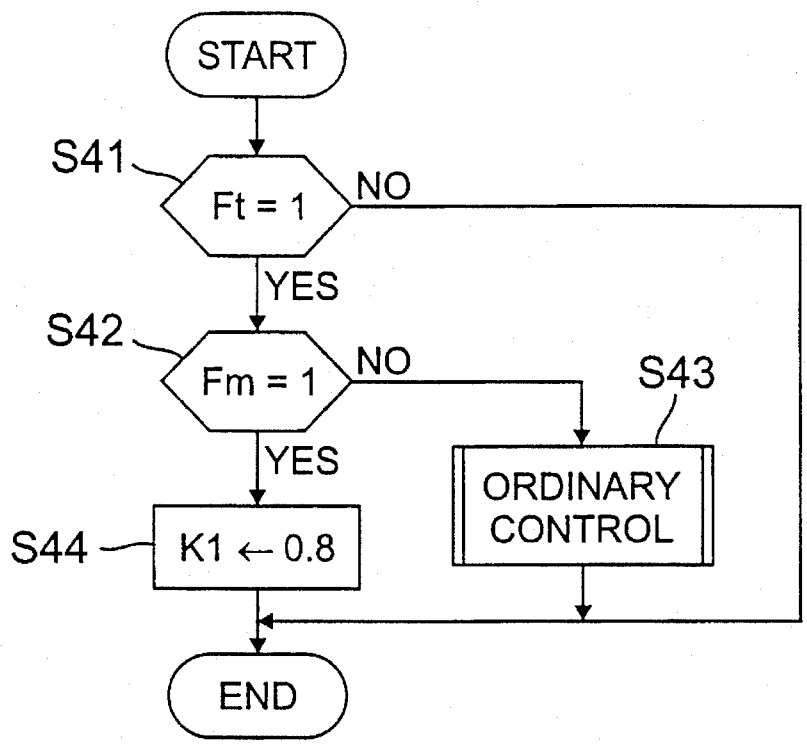
FIG. 9 is a flow chart illustrating a still further variation of the routine of traction control by engine control.

The traction control routine may be further changed as shown in FIG. 9. If the traction control is performed in the exhaust temperature reduction mode, the target slippage correction coefficient K1 for engine control is set to 0.8 at step S44. This results in a decrease in the eventual target slippage Te for engine control obtained from the equation (1). On the other hand, if the answer to the decision concerning the control mode flag Fm is "NO," the traction control is performed in the ordinary control mode at step S43.

In this instance, when, as a result of a rise in the temperature of catalyst above the predetermined temperature, the traction control changes from the ordinary control mode to the exhaust temperature reduction mode, the engine control pattern table (IV) for exhaust temperature reduction is selected. Because in this exhaust temperature reduction mode, the traction control is performed by both retarding the ignition timing and suspending fuel delivery to specific cylinders, the amount of unburned ingredients in the exhaust entering into the catalytic converter 48 per unit time is significantly reduced and, as a result, the catalytic converter 48 is prevented from suffering an extraordinary rise in temperature. In this event, the eventual target slippage Te for engine control is decreased, allowing the engine to decrease output torque. This results in the stability of traction control.

Figure 10:
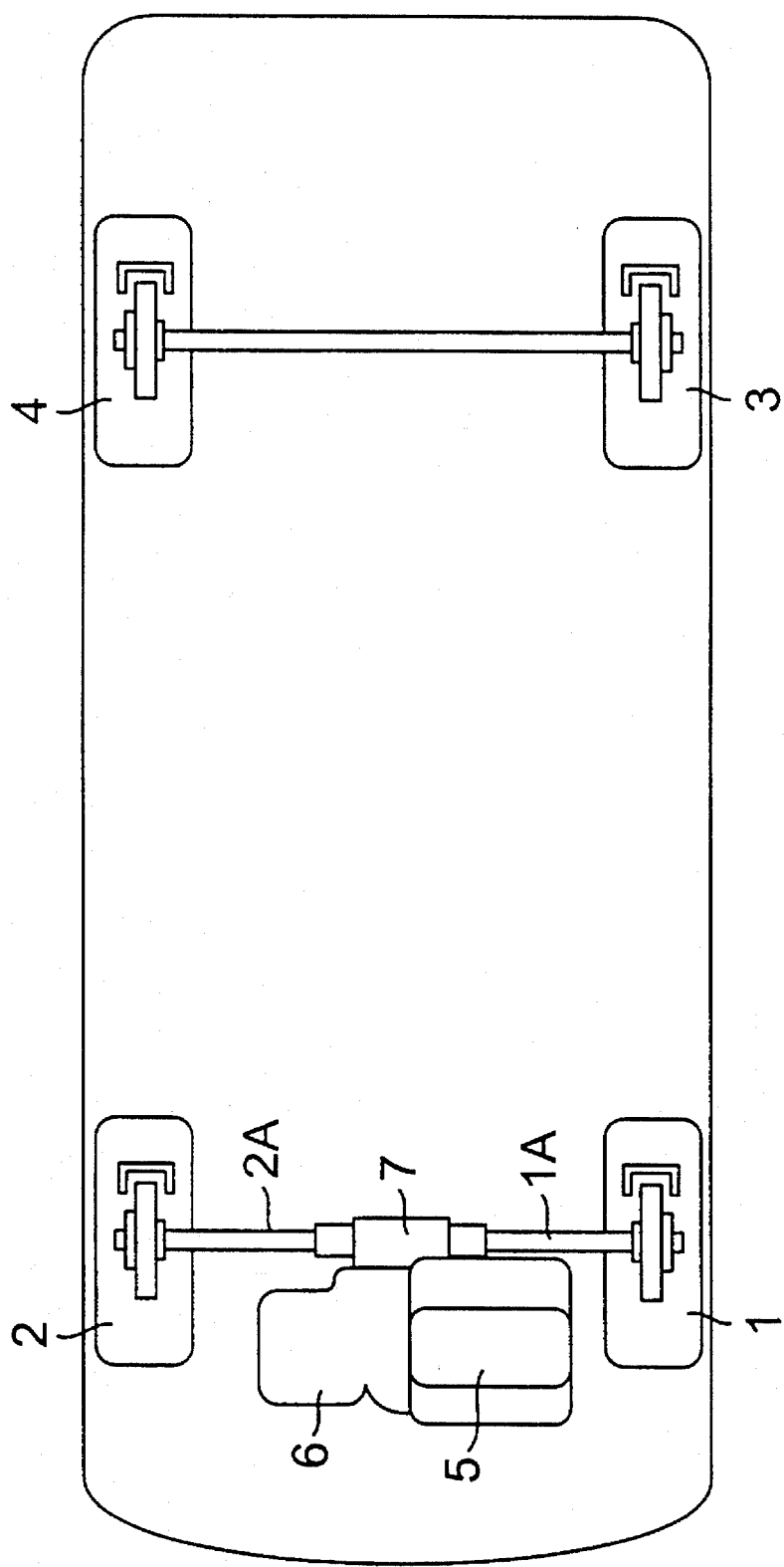
FIG. 10 is a schematic illustration of a front wheel drive automotive vehicle.
Figure 11:
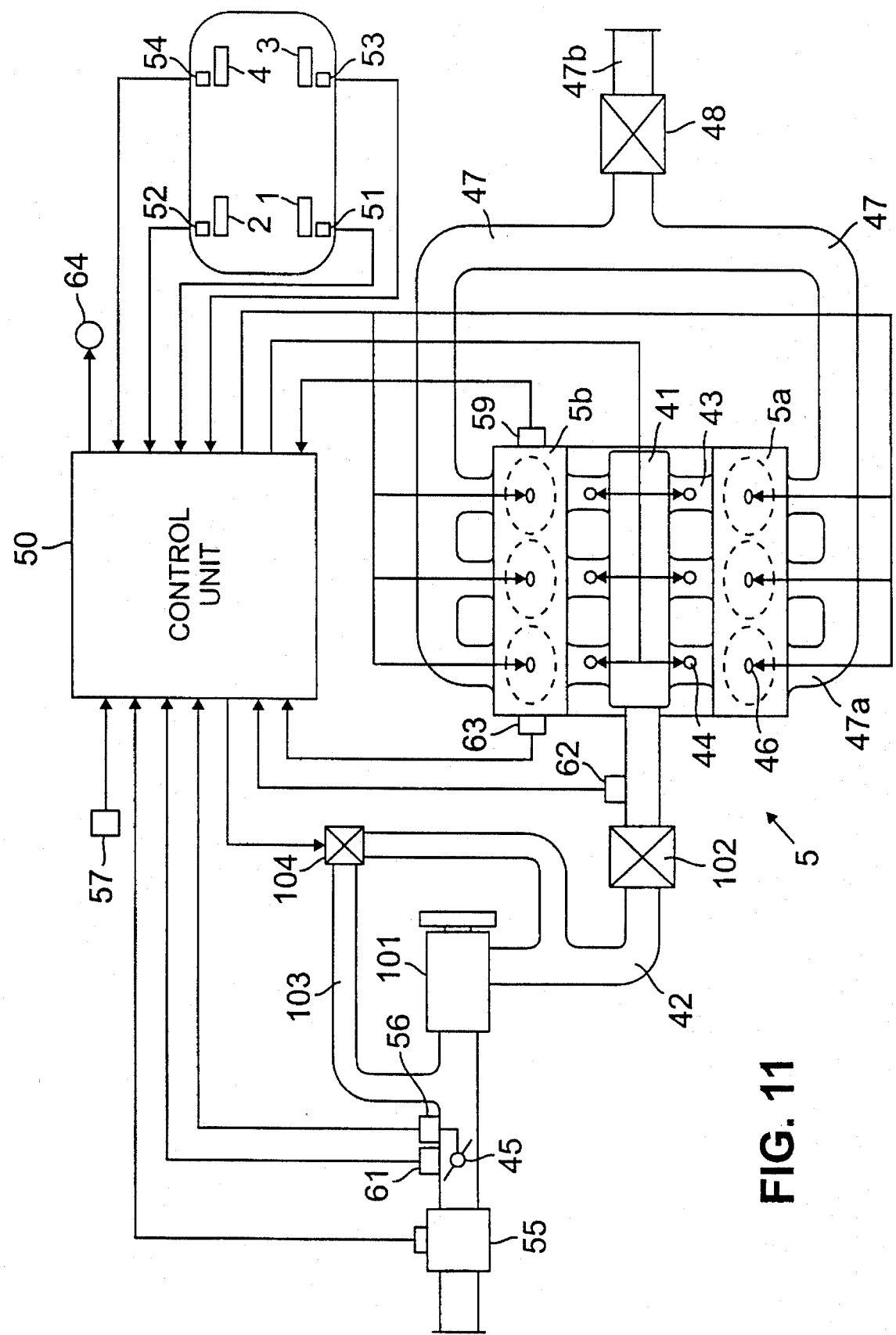
FIG. 11 is a schematic illustration of a traction control system in accordance with a preferred embodiment of the present invention incorporated in the front wheel drive automotive vehicle shown in FIG. 10.

Referring to FIGS. 10 and 11 showing a front-drive type of automotive vehicle equipped with a traction control system in accordance with another preferred embodiment of the present invention, the vehicle has front wheels 1 and 2 as driving wheels and rear wheels 3 and 4 as driven wheels. Engine output from an engine 5 is connected to the rear wheels 3 and 4 through front axles 1a and 2a, respectively, via an automatic transmission 6, a differential gear 7. The engine 5 is a V-type six-cylinder internal combustion engine having left and right cylinder banks 5a and 5b arranged in a V-formation with a predetermined relative angle. Above the engine 5 between the left and right banks 5a and 5b, there is placed a surge tank 41 connected to an intake pipe 42. The surge tank 41 is provided with six discrete intake pipes 43. Each discrete intake pipe 43, which may be formed integrally with, or separately formed from and attached to, the surge tank 41, extends from one side of the surge tank 41 to another side so as to be connected to an intake port of one of the cylinders in one of the banks remote from the one side of the surge tank 41. The discrete intake pipes 43 are provided with fuel injectors 44. Each fuel injector 44 is positioned so as to inject fuel into either the discrete intake pipe 43 or the related intake port (not shown).

The intake pipe 42 is provided, in order from the upstream end, with an air flow sensor 55, a throttle valve 45 operationally coupled to an accelerator pedal (not shown), a Rysholm type of supercharger 101 and an intercooler 102. Further, the intake pipe 42 is provided with a bypass pipe 103 for allowing intake air to bypass the supercharger 101. The bypass pipe 103 is provided with a bypass valve 104 for regulating supercharging pressure caused by the supercharger 101. When the bypass valve is in its closed position, it directs supercharging air discharged from the supercharger 101 to the cylinders through the intercooler 102 and the surge tank 41. On the other hand, when the bypass valve 104 is in its open position, it allows a part of the supercharging air discharged from the supercharger 101 to circulate or return into the intake pipe 42 upstream from the supercharger 101 through the bypass pipe 103 so as to lower the pressure of supercharging air directed toward the cylinders.

An exhaust pipe 47 has discrete exhaust pipes 47a branching off therefrom for connecting the exhaust pipe 47 with the cylinders of each cylinder bank 5a, 5b, respectively. These exhaust pipes 47 join together as an exhaust pipe extension 47b where a catalytic converter 48 is disposed. The engine 5 is further provided with an ignition plug 46 for each cylinder.

The traction control system includes an electronic control unit 50, such as comprising a microcomputer, to which various signals are transmitted from various sensors and switches. These sensors and switches include speed sensors 51, 52, 53 and 54 for detecting speeds of the respective wheels 1, 2, 3 and 4, respectively, an air flow sensor 55 for detecting an intake air flow rate Q, a position sensor 56 for detecting the position or opening of the throttle valve 45, an idle switch 61 for detecting the fully closed position, namely the idle position, of the throttle valve 45, a speed sensor 57 for detecting an engine speed Ne, a temperature sensor 59 for detecting the temperature of engine coolant, a pressure sensor 62 for detecting the pressure of intake air in the intake pipe 42 downstream from the supercharger 101, and a knock sensor 63 for detecting engine knocking due to engine detonation. These sensors and switch are well known to those skilled in the art may take any type well known in the art.

The electronic control unit 50 performs control of an ignition timing at which the ignition plug 46 is fired, control of the amount of fuel delivered by a given injector, and control of the pressure of supercharging air.

For controlling an ignition timing, the control unit 50 is loaded with first and second ignition timing maps. The first ignition timing map defines ignition timings according, for instance, to engine speed Ne and intake air flow rate Q as parameters for high octane gasoline. The second ignition timing map defines ignition timings, similar to the first ignition timing map, for regular gasoline. An ignition timing for each specific driving condition defined in the second ignition timing map is slightly retarded from the ignition timing for the same driving condition defined in the first ignition timing map. Based on the detected engine speed Ne and intake air flow rate Q, an optimum ignition timing is determined with reference to the ignition timing maps. An eventual ignition timing is determined by adding to the optimum ignition timing a corrective value depending upon knocking. In this instance, if an interval of knocking is greater than a predetermined value, the corrective value is unconditionally determined so as to retard the optimum ignition timing angle. On the other hand, if an interval of knocking is less than the predetermined value for a predetermined period of time, the corrective value is determined so as to advance gradually an optimum ignition timing angle.

If the corrective value of retardation in angle is greater than approximately 7°, the control unit 50 determines the gasoline is of the regular type, selecting the second ignition timing map.

In controlling the amount of fuel delivered by a given injector, the control unit 50 determines a basic amount of fuel based on the detected engine speed Ne and intake air flow rate Q and corrects it according to the temperature of engine coolant, providing an eventual amount of fuel.

For controlling the pressure of supercharging air, at first, the control unit 50 is loaded with a target supercharging pressure map which defines supercharging pressure Pt according, for instance, to engine speed Ne and throttle position θ as parameters. The opening of the bypass valve 104 is feedback controlled with a duty so as to cancel a pressure difference ΔP of the target supercharging pressure Pt from eventual pressure P of intake air downstream from the supercharger 101. That is, if the eventual intake air pressure P is lower than the target supercharging pressure Pt for a specific driving condition, the bypass valve 104 is closed. On the other hand, if the eventual intake air pressure P is higher than the target supercharging pressure Pt for a specific driving condition, the bypass valve 104 is opened.

In the traction control which the control unit 50 performs, either one of wheel speeds of the rear wheels 3 and 4 which is smaller than the other is selected as a vehicle speed Vr. A vehicle acceleration Va is calculated based on a change in the vehicle speed Vr. A road friction coefficient μ is determined with regard to these vehicle speed Vr and vehicle acceleration Va thus obtained by looking up the road friction coefficient table shown in table (I) above.

According to the vehicle speed Vr and road friction coefficient μ, a traction control commencement threshold slippage Ss and a traction control termination threshold slippage Se are determined. The traction control termination threshold slippage Se is smaller than the traction control commencement threshold slippage Ss. Thereafter, an arithmetic mean slippage Sav of slippage S of the front driving wheels 1 and 2 is calculated and either one of these slippage S which is larger than the other is taken as the largest slippage Shi. When the largest slippage Shi has reached the traction control commencement threshold slippage Ss, it is judged that the front driving wheels 1 and 2 are slipping and a slippage flag Fs is set to a state of 1 (one). On the other hand, when the largest slippage Shi has decreased below the traction control commencement threshold slippage Ss, it is judged that the front driving wheels 3 and 4 are free from slipping and the slippage flag Fs is reset to a state of 0 (zero).

Figure 12:
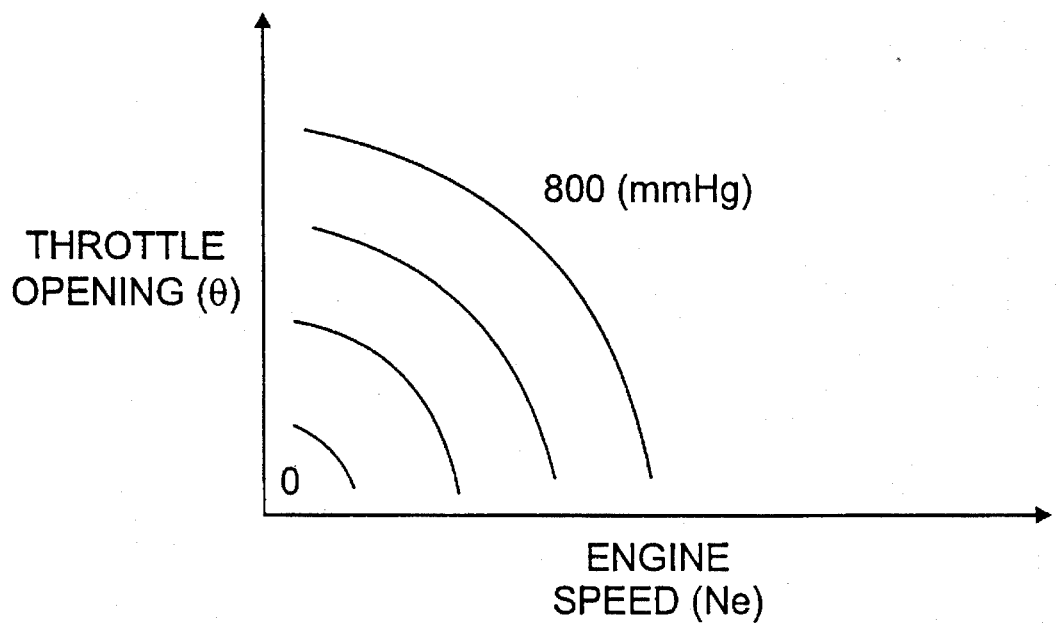
FIG. 12 is a map of target supercharging pressure.

The traction control is performed by controlling either one or both of engine output torque and charging pressure. In the traction control in the charging pressure control mode, when the pressure of intake air P is higher than the atmospheric pressure, it is determined that a specific driving condition is in a supercharging driving range where supercharging must be performed. Then, the opening of bypass valve 104 is feedback controlled based on the intake air pressure P so as to develop the target supercharging pressure Pt found from a supercharging pressure map such as shown in FIG. 12, defined according to engine speed Ne and throttle opening θ. Together, basic target slippage is found from a basic target slippage map defined using vehicle speed Vr and road friction coefficient μ as parameters. An eventual target slippage Te for supercharger control is calculated.

Thereafter, calculations are made to obtain a slippage difference ΔSe of the mean slippage Sav from the eventual target slippage Te for supercharger control and a change Dse in the slippage difference ΔSe between a latest control sequence and the preceding control sequence. Based on the slippage difference ΔSe and slippage difference change Dse thus calculated, an appropriate basic control label is found from the valve control label table as shown in table (V). An eventual rate at which the bypass valve 104 opens or closes is found in a valve control rate table as shown in table (VI).

TABLE (VI)

VALVE CONTROL RATE TABLE

| Control Label | NB | NM | NS | ZO | PS | PM | PB |
|---|---|---|---|---|---|---|---|
| Rate (%/sec) | −8 | −5 | −2 | 0 | +2 | +5 | +10 |

In the valve control rate table, the label ZO indicates maintaining the opening; the label N indicates closing the bypass valve 104; the label P indicates opening the bypass valve 104; and the labels S, M and B indicate high, moderate and low speeds of opening or closing the bypass valve 104. For example the label PB indicates that the bypass valve 104 opens at a rate of 10% per second.

In the traction control in the engine control mode, basic target slippage for engine control is found from a basic target slippage table defined using vehicle speed Vr and road friction coefficient μ as parameters. Together, an eventual target slippage Te for engine control is obtained by making a correction of the basic target slippage. Thereafter, calculations are made to obtain a slippage difference ΔSe of the mean slippage Sva from the eventual target slippage Te and a change Dse in the slippage difference ΔSe between a latest control sequence (i) and the preceding control sequence (i−1). Based on these slippage difference ΔSe and slippage difference change Dse thus calculated, an appropriate basic control level L is found from the control level table (II) shown above. From the above equation (IV), an eventual control level EL is determined.

With reference to the eventual control level EL, an engine control pattern is determined from the basic control pattern table (III).

In addition to the basic control pattern table (III) shown above, a first to third corrected pattern tables (VII)–(IX) shown below are provided.

TABLE (VII)

FIRST CORRECTED PATTERN TABLE

| EL | \multicolumn{6}{c}{Cylinder No.} |
|---|---|---|---|---|---|---|
|  | 1 | 2 | 3 | 4 | 5 | 6 |
| 1 |  |  |  |  |  |  |
| 2 |  |  |  |  |  |  |
| 3 | x | x |  |  |  |  |
| 4 | x | x |  |  |  |  |
| 5 | x | x |  |  |  |  |
| 6 | x | x | x |  |  |  |
| 7 | x | x | x |  |  |  |
| 8 | x | x | x | x |  |  |

TABLE (VII)-continued

FIRST CORRECTED PATTERN TABLE

| EL | Cylinder No. | | | | | |
|---|---|---|---|---|---|---|
|  | 1 | 2 | 3 | 4 | 5 | 6 |
| 9 | x | x | x | x |  |  |
| 10 | x | x | x | x | x |  |
| 11 | x | x | x | x | x | x |

TABLE (VIII)

SECOND CORRECTED PATTERN TABLE

| Rank | EL | Cylinder No. | | | | | |
|---|---|---|---|---|---|---|---|
|  |  | 1 | 2 | 3 | 4 | 5 | 6 |
| 1st | 1 | ↓ | ↓ | ↓ | ↓ | ↓ | ↓ |
|  | 2 | ↓ | ↓ | ↓ | ↓ | ↓ | ↓ |
|  | 3 | x | x |  |  |  |  |
| 2nd | 4 | ↓ | ↓ | ↓ | ↓ | ↓ | ↓ |
|  | 5 | x | x |  |  |  |  |
| 3rd | 6 | ↓ | ↓ | ↓ | ↓ | ↓ | ↓ |
|  | 7 | x | x | x |  |  |  |
| 4th | 8 | ↓ | ↓ | ↓ | ↓ | ↓ | ↓ |
|  | 9 | x | x | x | x |  |  |
| 5th | 10 | ↓ | ↓ | ↓ | ↓ | ↓ | ↓ |
|  | 11 | x | x | x | x | x | x |

TABLE (IX)

THIRD CORRECTED PATTERN TABLE

| Rank | EL | Cylinder No. | | | | | |
|---|---|---|---|---|---|---|---|
|  |  | 1 | 2 | 3 | 4 | 5 | 6 |
| 1st | 1 | ↓ | ↓ | ↓ | ↓ | ↓ | ↓ |
|  | 2 | ↓ | ↓ | ↓ | ↓ | ↓ | ↓ |
|  | 3 | ↓ | ↓ | ↓ | ↓ | ↓ | ↓ |
|  | 4 | ↓ | ↓ | ↓ | ↓ | ↓ | ↓ |
|  | 5 | x | x |  |  |  |  |
| 2nd | 6 | ↓ | ↓ | ↓ | ↓ | ↓ | ↓ |
|  | 7 | ↓ | ↓ | ↓ | ↓ | ↓ | ↓ |
|  | 8 | ↓ | ↓ | ↓ | ↓ | ↓ | ↓ |
|  | 9 | x | x | X | X |  |  |
| 3rd | 10 | ↓ | ↓ | ↓ | ↓ | ↓ | ↓ |
|  | 11 | x | x | x | x | x | x |

Figure 13:
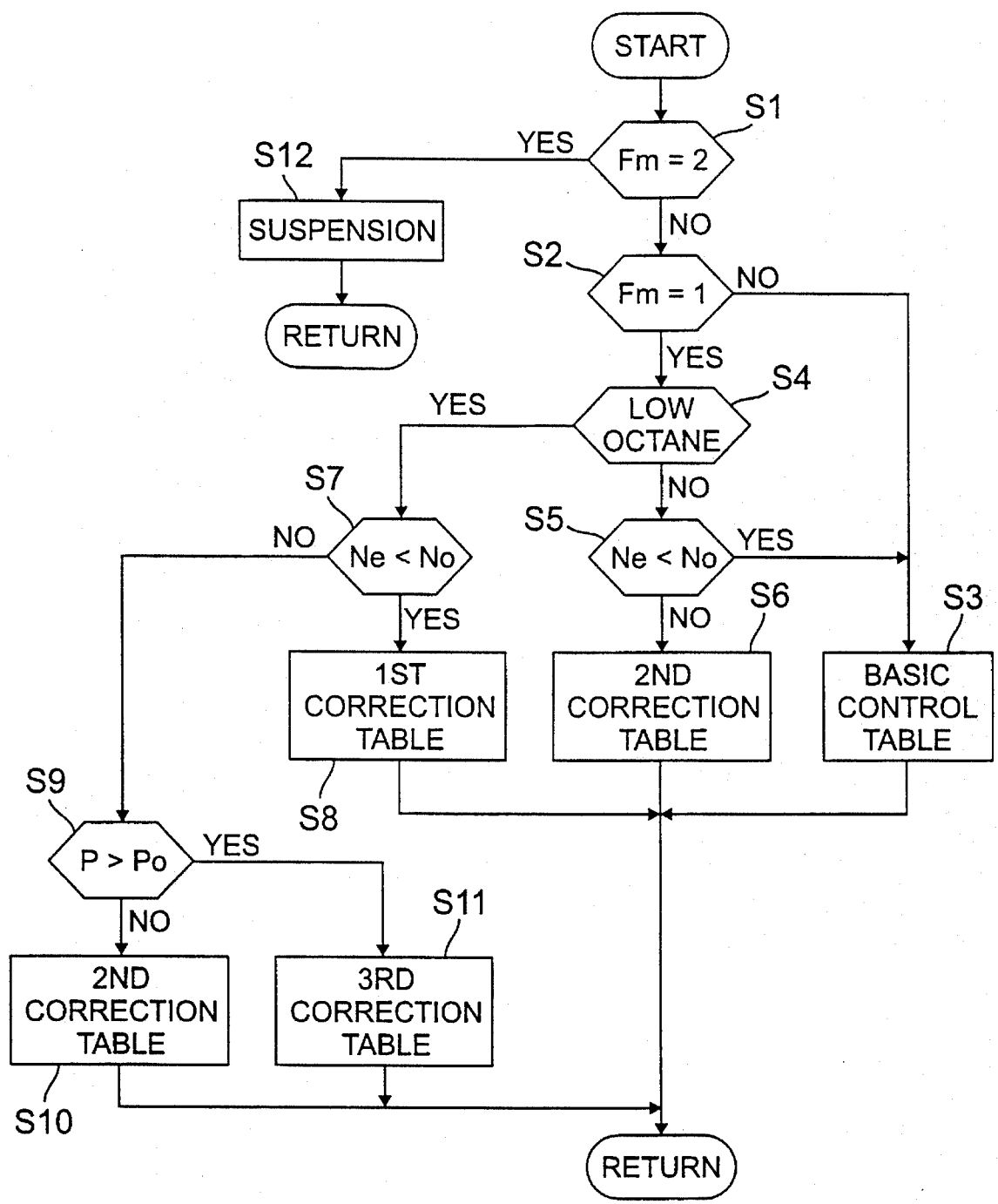
FIG. 13 is a flow chart illustrating a routine of traction control by engine control for the traction control system shown in FIG. 11.

Referring now to FIG. 13, which is a flow chart of the taction control sequence routine in the engine control mode, the traction control routine commences and control passes directly to a function block at step S1 where a decision is made as to whether a control mode flag Fm has been set to a state of 2, which indicates that the traction control is suspended. If the answer to the decision is "YES," then the traction control is suspended at step S12 and returns. If the answer to the decision is "NO" then another decision is made at step S2 as to whether the mode flag Fm has been set to the state of 1, which indicates the exhaust temperature reduction mode. If the answer to the decision is "NO," this indicate the ordinary control mode, and the basic control level table (II) is selected at step S3. For example, if the eventual control level EL is "2" the engine control is performed in the pattern where the ignition timing is retarded by an angle of 15°. If the eventual control level EL is "3," the engine control is performed in the pattern where the suspension of fuel delivery to two cylinders takes place.

On the other hand, if the answer to the decision made at step S2 is "YES," another decision is made at step S4 as to whether there is used a low octane gasoline. This decision is made based on the eventually ignition timing corrected depending upon knocking. Specifically, if the corrective retardation greater than an angle of 7° takes place, then, the type of gasoline is determined to be low octane gasoline. If the answer to the decision concerning the type of gasoline is "NO," this indicate that the gasoline is of a high octane type, then, a decision is made at step S5 as to whether the engine speed Ne is lower than a predetermined speed No, for instance 4,000 rpm. If the answer to the decision is "YES," the basic control level table (II) is selected at step S3. On the other hand, if the answer to the decision is "NO," the second corrected pattern table (VIII) is selected at step S6. In this instance, the first to eleventh eventual control levels EL are divided into five ranks.

If the answer to the decision concerning gasoline type made at step S4 is "YES," this indicates that the regular type of gasoline is used, then another decision is made at step S7 as to whether the engine speed Ne is lower than the predetermined speed No of 4,000 rpm. If the answer to the decision is "YES," the first corrected pattern table (VII) is selected at step S8. On the other hand, if the answer to the decision is "NO," a decision is made at step S9 as to whether the intake air pressure P is higher than a predetermined pressure Po. If the answer to the decision is "NO," the second corrected pattern table (VIII) is selected at step S10. However, if the answer to the decision is "YES," the third corrected pattern table (IX) is selected at step S11. In the third corrected pattern table (IX), the first to eleventh eventual control levels EL are divided into three ranks.

Figure 14:
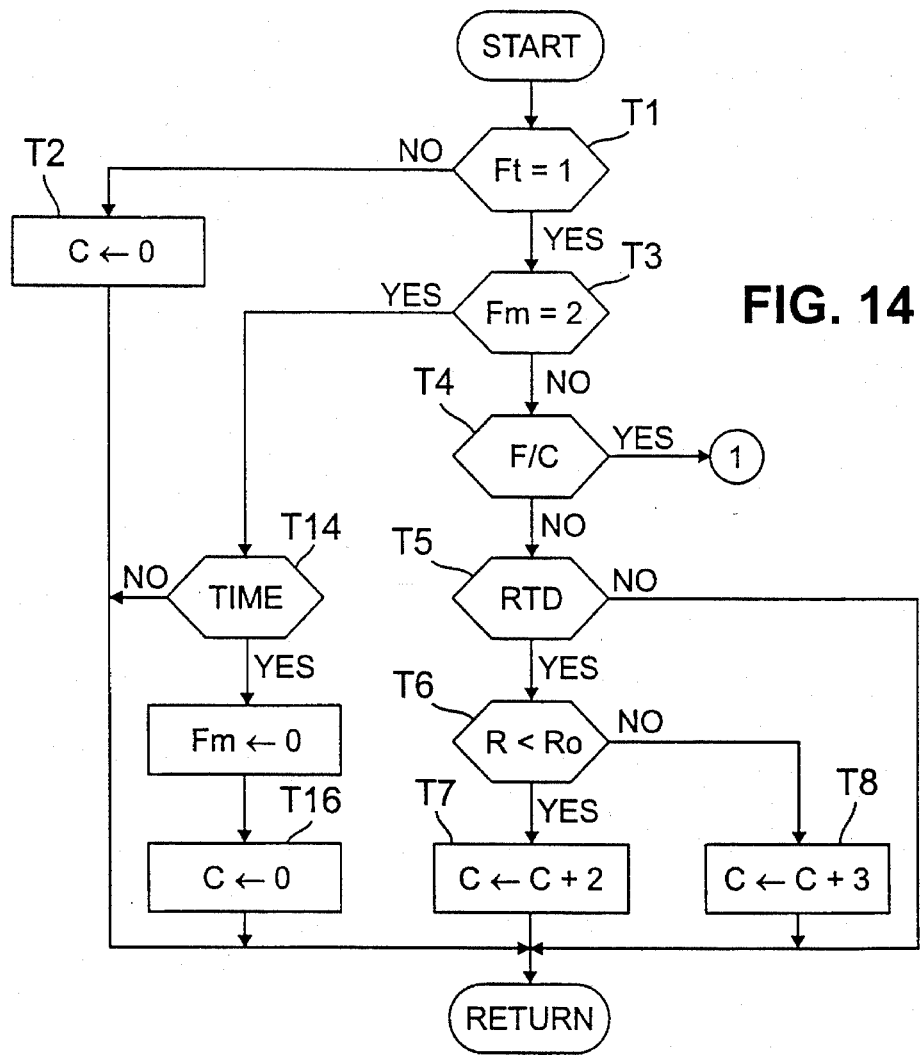
FIGS. 14 and 15 are a flow chart illustrating a catalytic converter temperature estimation routine.
Figure 15:
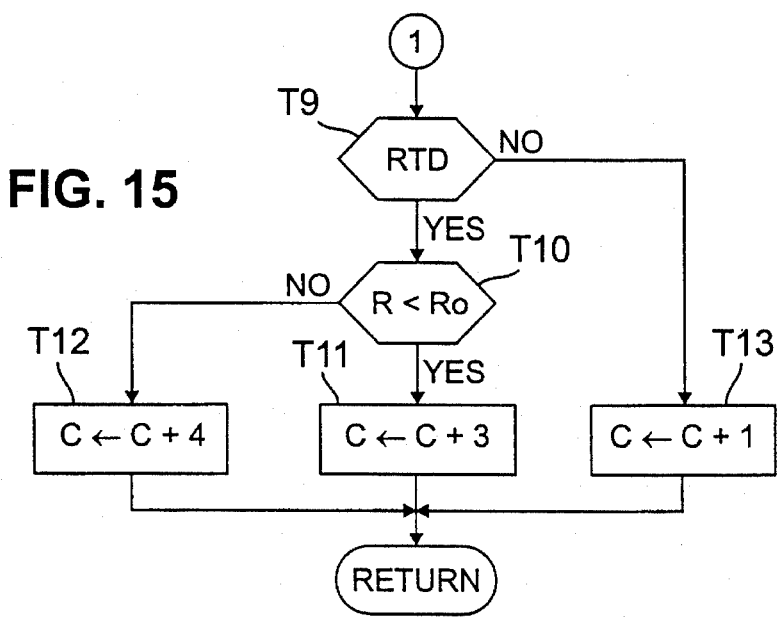

In the traction control, the temperature of catalytic converter is estimated by a temperature estimation routine illustrated by a flow chart in FIGS. 14 and 15. The first step at step T1 in FIG. 14 is to make a decision as to whether the traction control flag Ft has been set. If the answer to the decision is "NO," after resetting the count C of a control counter to 0 (zero) at step T2, the estimation routine returns. On the other hand, if the answer to the decision is "YES," a decision is made at step T3 as to whether the control mode flag Fm has been set to the state of "2" which indicates the control suspension mode. If the answer to the decision is "NO," another decision is made at step T4 as to whether suspension of fuel delivery (F/C) takes place. If the answer to the decision is "NO," a decision is further made at step T5 as to a retardation of ignition timing (RTD) take place. If the answer to the decision is "Yes," then at step T6, a decision is made as to whether the angle of retardation R is smaller than a predetermined angle Ro. If in fact the angle of retardation R is smaller than the predetermined angle Ro, the counter changes its count C by an increment of 2 at step T7. If the angle of retardation R is not smaller than the predetermined angle Ro, the counter changes its count C by an increment of 3 at step T8.

On the other hand, if the answer to the decision concerning fuel delivery suspension made at step T4 is "YES," a decision is further made at step T9 (see FIG. 15) as to a retardation of ignition timing (RTD) take place. If the answer to the decision is "Yes," then at step T10, a decision is made as to whether the angle of retardation R is smaller than the predetermined angle Ro. If the angle of retardation R is smaller than the predetermined angle Ro, the counter changes its count C by an increment of 3 at step T11. If the angle of retardation R is not smaller than the predetermined angle Ro, the counter changes its count C by an increment of 4 at step T12.

On the other hand, if the answer to the decision concerning the retardation made at step T9 is "NO," the counter changes its count C by an increment of 1 at step T13.

Referring back to FIG. 14, if the answer to the decision concerning control modes made at step T3 is "YES," then a decision is made at step T14 as to whether a predetermined period of time (TIME) has passed from a time of setting the control mode flag Fm to the state of 2. If the answer to the decision is "YES," after resetting the control mode flag Fm to 0 (zero) at step T15, the counter sets the counter C to 0 at step T16.

As described above, because the counter increases its count C when fuel delivery suspension takes place and the change in count becomes larger with an increase in the angle of retardation, the count C represents the temperature of the catalytic converter 48.

Figure 16:
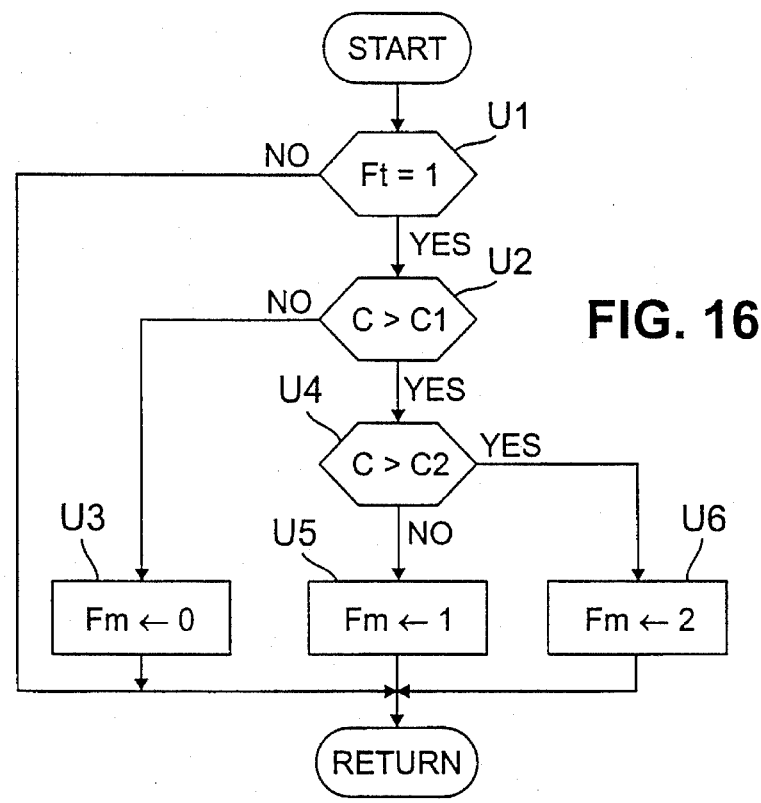
FIG. 16 is a flow chart illustrating a routine of changing control mode during the traction control.

FIG. 16 shows a flow chart illustrating a control mode flag setting routine. The traction control routine commences and control passes directly to a function block at step U1 where a decision is made as to whether the traction control flag Ft has been set up or set to a state of 1 (one) which indicates that the traction control is under execution. If the answer to the decision is "YES," a decision is made at step U2 as to whether the count C has reached a first predetermined count C1. If the answer to the decision is "NO," then the control mode flag Fm is reset. On the other hand, if the answer to the decision is "YES," another decision is made at step U4 as to whether the count C has reached a second predetermined count C2 which is larger than the first predetermined count Cl. If the answer to the decision is "NO," this indicates that the count is between the first and second predetermined counts C1 and C2, the control mode flag Fm is set to the state of 1, which indicates the exhaust temperature reduction mode at step U5. If the answer to the decision is "YES," then the control mode flag Fm is set to the state of 2, which indicates the control suspension mode at step U6.

In the traction control, because immediately after commencement of the traction control the count C that the control counter has counted is smaller than the first predetermined count C1, the control mode flag Fm is reset down to the state of 0 indicating the ordinary control mode at step U3 and, as a result, the basic control pattern table (III) is selected. Accordingly, the engine control is precisely performed by means of the suspension of fuel delivery and the retardation of fuel ignition timing in combination with prompt convergence of slippage due to spin. As the traction control progresses, the control counter increases the count C. When the count C reaches the first predetermined count C1, the control mode flag Fm is set up to the state of 1, forcing the traction control to change to the exhaust temperature reduction mode. In this instance, when the gasoline is of the specified high octane type and the engine speed Ne is lower than the predetermined speed No of, for instance, 4,000 rpm, the basic control pattern table (III) is selected, performing precisely the traction control by means of the suspension of fuel delivery and the retardation of fuel ignition timing in combination. On the other hand, when the engine speed Ne is lower than the predetermined speed No, the second corrected pattern table (VIII) is selected. In this pattern, while the retardation of ignition timing does not take place, nevertheless, two cylinders are subjected to the suspension of fuel delivery even for the eventual control levels EL of "1" and "2", significantly reducing the amount of unburned ingredients in the exhaust entering into the catalytic converter 48 per unit time, so as to prevent the catalytic converter 48 from suffering an extraordinary rise in temperature.

When the control counter further counts up over the second predetermined count C2, the control mode flag Fm is set up to the state of 2, forcing the traction control to suspend the engine control. As a result, the catalytic converter 48 is prevented from suffering an extraordinary rise in temperature. When the predetermined period of time Ti has passed from a time of setting the control mode flag Fm to the state of 2, the control mode flag Fm is reset down to the state of 0 and the control counter resets the count C. Accordingly, the basic control pattern table (III) is selected, performing precisely the traction control by means of the suspension of fuel delivery and the retardation of fuel ignition timing in combination.

On the other hand, when, under the use of gasoline is of the regular type having an octane value lower than that of the specified high octane type of gasoline, the control counter counts up over the first predetermined count C1, the control mode flag Fm is set up to the state of 1, changing the traction control to the exhaust temperature reduction mode. In this event, when the engine speed Ne is lower than the predetermined speed No, the first corrected pattern table (VII) is selected in place of the basic control pattern table (III). Consequently, even when the second ignition timing map, in which ignition timings are slightly retarded from those in the first ignition timing map for high octane type of gasoline, is used, the eventual ignition timing is not retarded in excess, so as to suppress an increase in the amount of unburned ingredients in the exhaust. As a result, oxidization of the unburned ingredients in the exhaust with the catalyst is suppressed, preventing the catalytic converter 48 from suffering an extraordinary rise in temperature.

By contrast, when the engine speed Ne is lower than the predetermined speed No, either one of the second and the third corrected pattern tables (VIII) and (IX) is selected according to the pressure of the supercharging air directed into the engine 5. Specifically, when the pressure of the intake air P is lower than the predetermined pressure Po, the second corrected pattern table (VIII) is selected. In this event, even when the eventual engine control level EL is "1" or "2," two cylinders are subjected to the suspension of fuel delivery. As a result, an increase in the amount of unburned ingredients in the exhaust is suppressed, so as to suppress oxidization of the unburned ingredients in the exhaust with the catalyst, preventing the catalytic converter 48 from suffering an extraordinary rise in temperature. On the other hand, when the engine speed Ne is higher than the predetermined speed No, the third corrected pattern table (IX) is selected. In this event, even in the engine control pattern defined by the same eventual engine control level EL, the number of cylinders which are subjected to the suspension of fuel delivery increases. As a result, the amount of unburned ingredients in the exhaust entering into the catalytic converter 48 per unit time is significantly reduced, so that, even when a great amount of supercharging air is delivered into the engine 5 at a high pressure, the amount of unburned ingredients in the exhaust entering into the catalytic converter 48 is greatly reduced, so as to suppress more certainly oxidization of the unburned ingredients in the exhaust with the catalyst.

Figure 17:
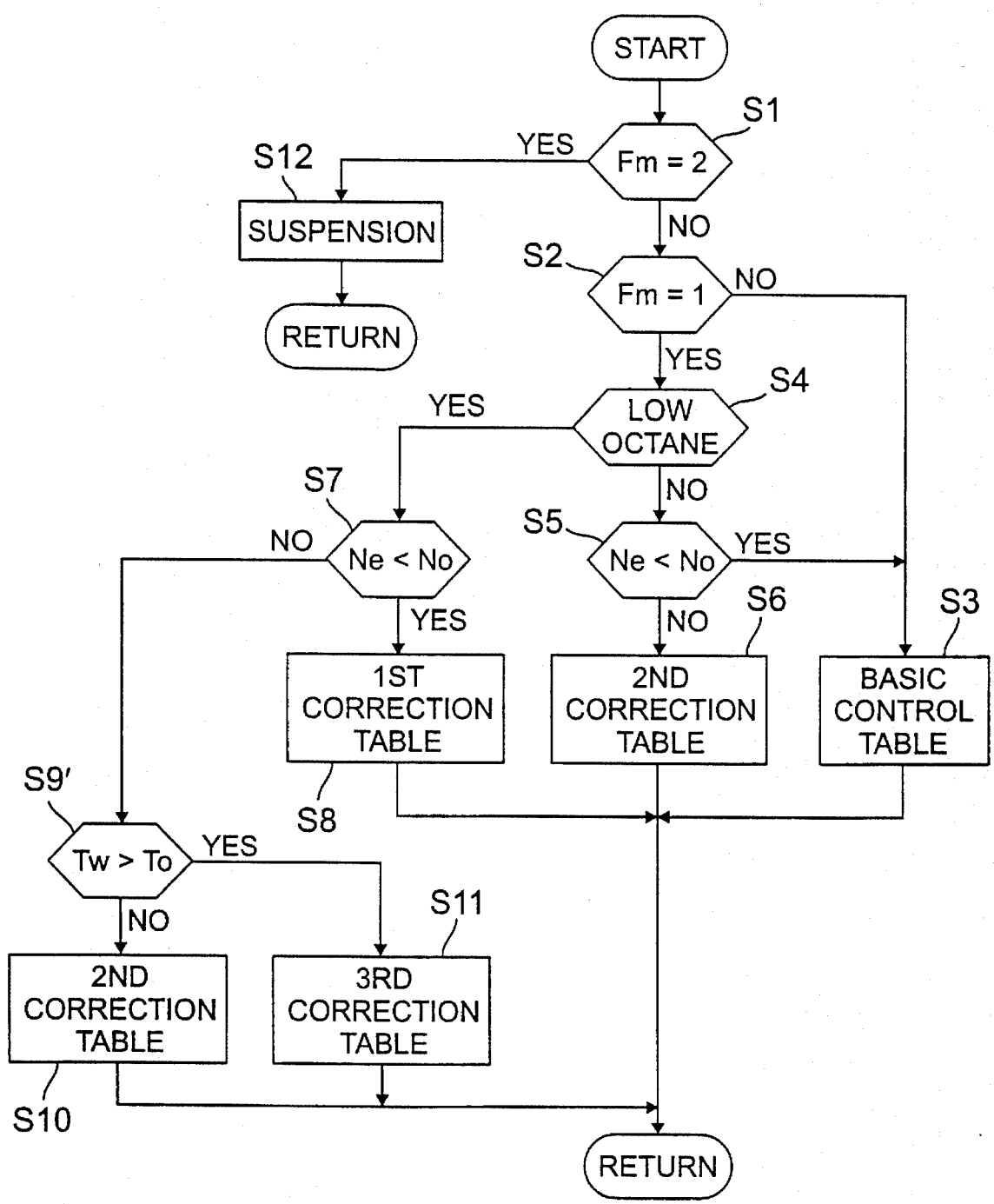
FIG. 17 is a flow chart illustrating another variation of the routine of traction control by engine control.

In the taction control sequence routine illustrated by the flow chart in FIG. 13, the decision made at step S9 may be changed so as to compare the temperature of engine coolant Tw with a predetermined temperature To. As shown in FIG. 17 showing a version of the traction control sequence, when the engine speed Ne is lower than the predetermined speed No of, for instance, 4,000 rpm, a decision is made at step S9' as to whether the temperature of engine coolant Tw is higher than the predetermined temperature To. If the answer to the decision is "NO," then, the second corrected pattern table (VIII) is selected. On the other hand, if the answer to the decision is "YES," then the third corrected pattern table (IX) is selected. In this event, even in the engine control pattern defined by the same eventual engine control level EL, the number of cylinders which are subjected to the suspension of fuel delivery increases, significantly reducing the amount of unburned ingredients in the exhaust entering into the catalytic converter 48 per unit time.

Figure 18:
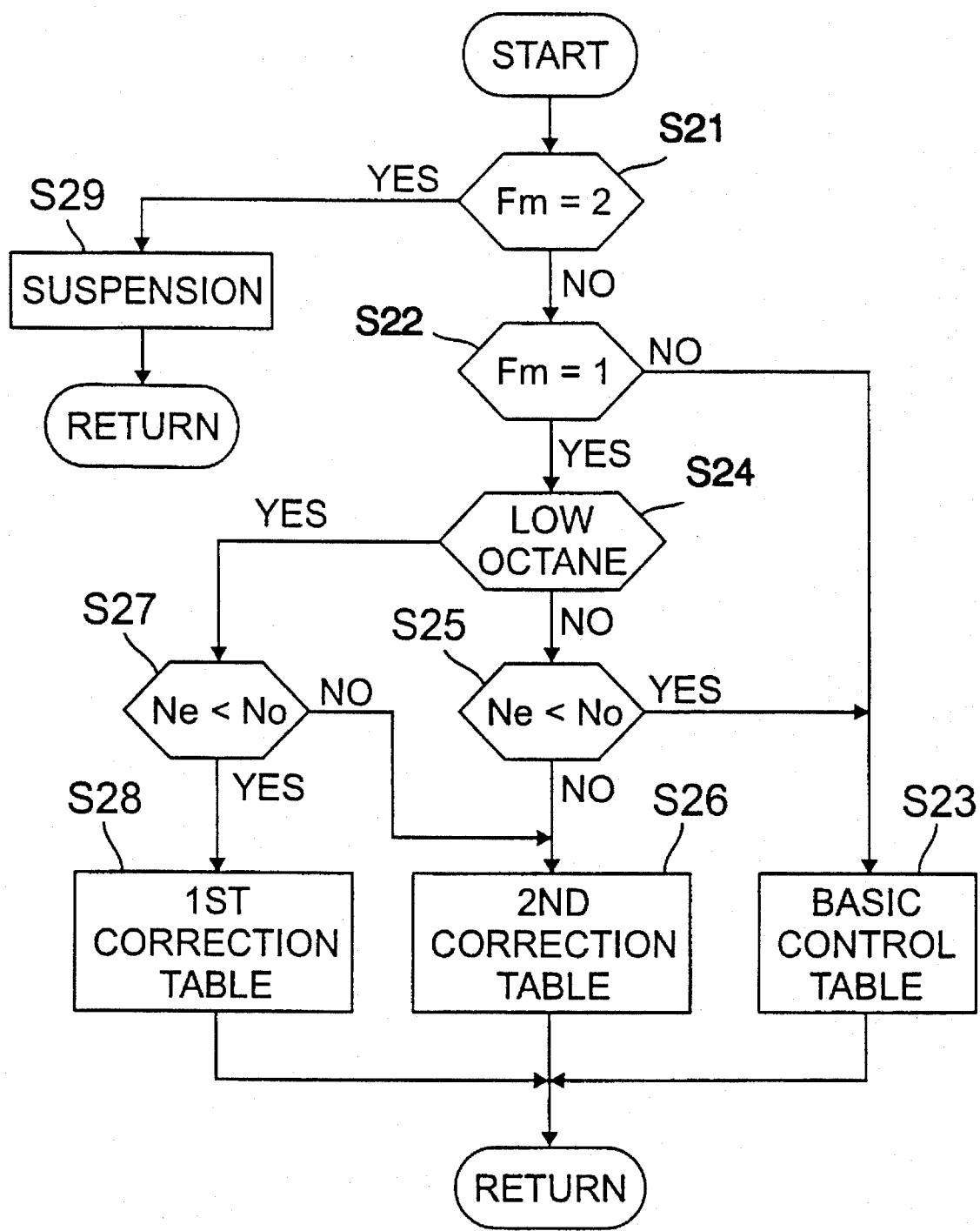
FIG. 18 is a flow chart illustrating still another variation of the routine of traction control by engine control.

FIG. 18 shows a flow chart of the taction control sequence routine performed by a traction control system in accordance with another preferred embodiment of the present invention. The traction control routine commences and control passes directly to a function block at step S21 where a decision is made as to whether a control mode flag Fm has been set to a state of 2 which indicates that the traction control is suspended. If the answer to the decision is "YES," then the control returns. If the answer to the decision is "NO," then another decision is made at step S22 as to whether the mode flag Fm has been set to the state of 1 which indicates the exhaust temperature reduction mode If the answer to the decision is "NO," this indicates the ordinary control mode, and the basic control level table (II) is selected at step S23.

On the other hand, if the answer to the decision made at step S22 is "YES," another decision is made at step S24 as to whether there is used a low octane gasoline. This decision is made based on the eventually ignition timing corrected depending upon knocking. If the answer to the decision concerning the type of gasoline is "NO," this indicate that the gasoline is of a high octane type, then, a decision is made at step S25 as to whether the engine speed Ne is lower than the predetermined speed No. If the answer to the decision is "YES," the basic control level table (II) is selected at step S23. On the other hand, if the answer to the decision is "NO," the second corrected pattern table (VIII) is selected at step S26. If the answer to the decision concerning gasoline type made at step S24 is "YES," this indicates that the regular type of gasoline is used, then, another decision is made at step S27 as to whether the engine speed Ne is lower than the predetermined speed No. If the answer to the decision is "YES," the first corrected pattern table (VII) is selected at step S28. However, if the answer to the decision is "NO," then the second corrected pattern table (VIII) is selected at step S26.

If the answer to the decision concerning the control mode flag Fm made at step S21 is "NO," then the traction control is suspended at step S29 and returns.

In the traction control of this embodiment, the catalytic converter 48 is prevented from suffering an extraordinary rise in temperature, providing precise traction control according to engine operating conditions.

Figure 19:
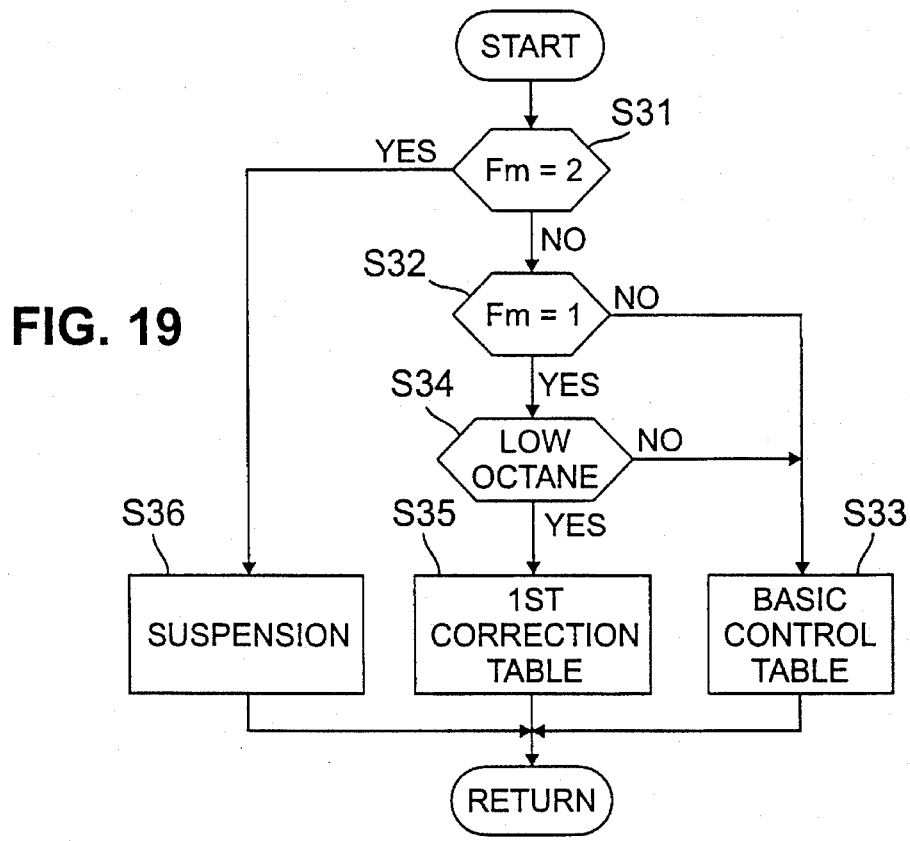
FIG. 19 is a flow chart illustrating a further variation of the routine of traction control by engine control.

FIG. 19 shows a flow chart of the taction control sequence routine performed by a traction control system in accordance with still another preferred embodiment of the present invention. The traction control routine commences and control passes directly to a function block at step S31 where a decision is made as to whether a control mode flag Fm has been set to a state of 2 which indicates that the traction control is suspended. If the answer to the decision is "YES," then the control returns. If the answer to the decision is "NO," then another decision is made at step S32 as to whether the mode flag Fm has been set to the state of 1 which indicates the exhaust temperature reduction mode. If the answer to the decision is "NO," this indicate the ordinary control mode, then, the basic control level table (II) is selected at step S33.

On the other hand, if the answer to the decision made at step S32 is "YES," another decision is made at step S34 as to whether a low octane gasoline is being used. If the answer to the decision concerning the type of gasoline is "NO," then the basic control level table (II) is selected at step S33. If the answer to the decision is "YES," the first corrected pattern table (VII) is selected at step S35. If the answer to the decision concerning the control mode flag Fm made at step S31 is "NO," then the traction control is suspended at step S36 and returns.

With the traction control sequence, the catalytic converter 48 is prevented from suffering an extraordinary rise in temperature, providing precise traction control according to engine operating conditions.

Figure 20:
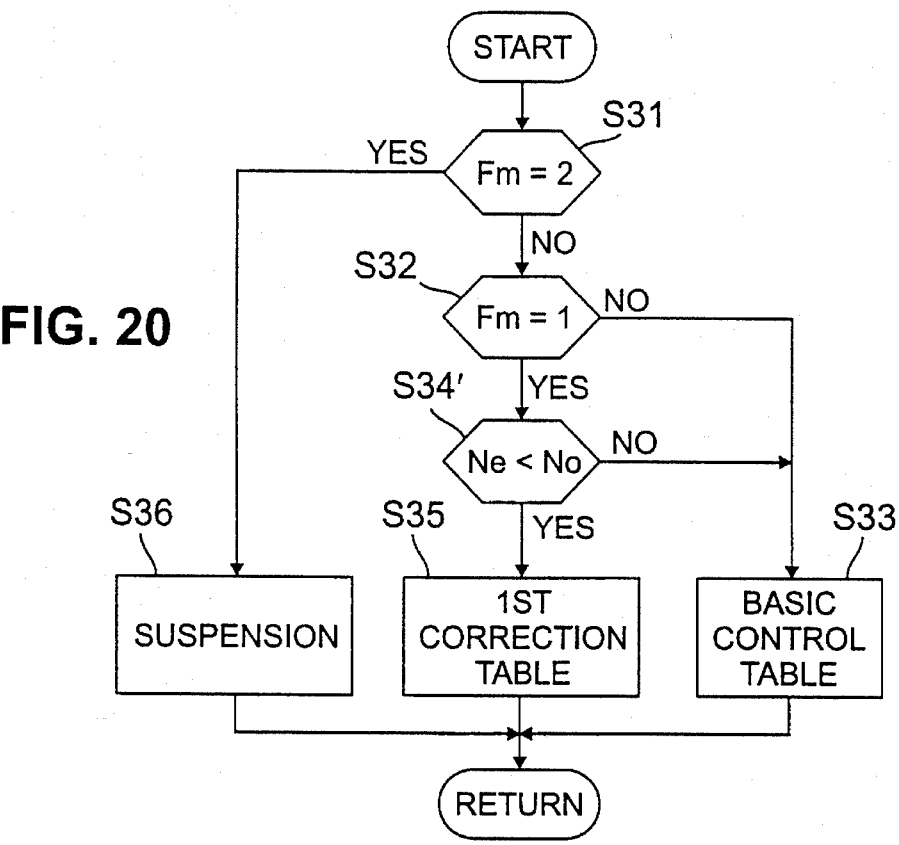
FIG. 20 is a flow chart illustrating a still further variation of the routine of traction control by engine control.

In the taction control sequence routine illustrated by the flow chart in FIG. 19, the decision made at step S34 may be changed so as to compare the speed of engine Ne with the predetermined speed No, or otherwise the temperature of engine coolant Tw with a predetermined temperature To. Specifically, as shown FIG. 20, when the control mode flag Fm is set to the state of 1, a decision is made at step S34' as to whether the speed of engine Ne is higher than the predetermined speed No. If the answer to the decision concerning the type of gasoline is "NO," then, the basic control level table (II) is selected at step S33. On the other hand, if the answer to the decision is "YES," the first corrected pattern table (VII) is selected at step S35.

Figure 21:
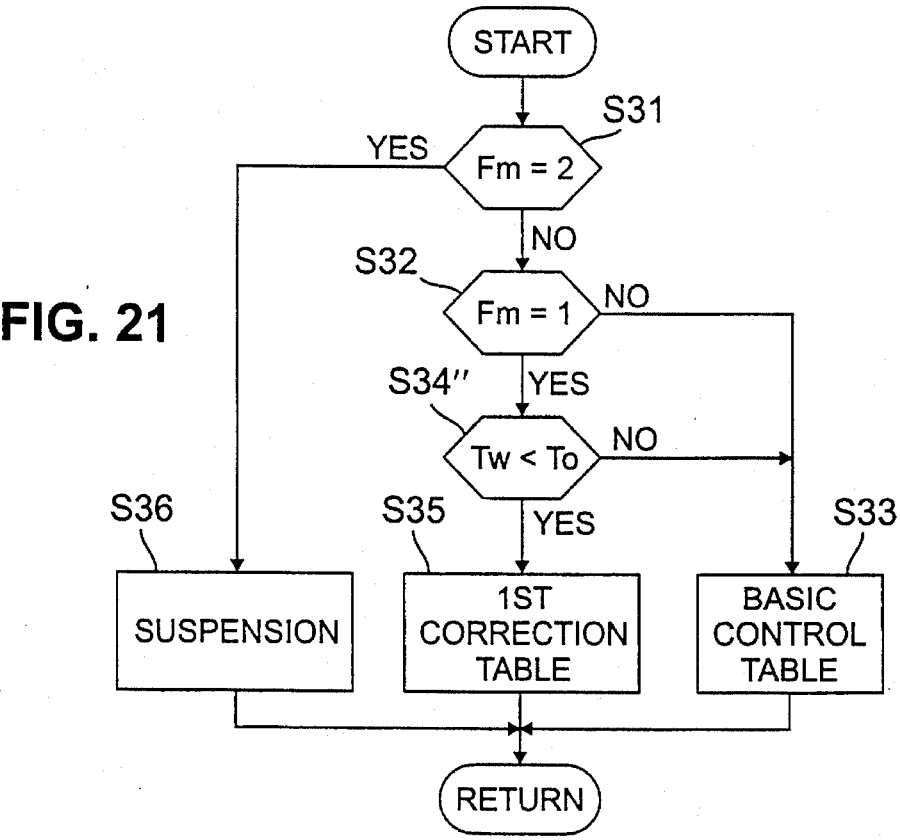
FIG. 21 is a flow chart illustrating another variation of the routine of traction control by engine control.

Alternatively, as shown in FIG. 21, when the control mode flag Fm is set up to the state of 1, a decision is made at step S34" as to whether the temperature of engine coolant Tw is higher than the predetermined temperature To. If the answer to the decision concerning the type of gasoline is "NO," then the basic control level table (II) is selected at step S33. On the other hand, if the answer to the decision is "YES," the first corrected pattern table (VII) is selected at step S35.

With these traction control sequences, the catalytic converter 48 is prevented from suffering an extraordinary rise in temperature, and precise traction control is provided according to engine operating conditions.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What I claim is:

1. A traction control system for an automotive vehicle for performing a traction control by controlling an engine equipped with an exhaust system having a catalytic converter so as to reduce driving force delivered to driving wheels, thereby diminishing excessive slippage of said driving wheels, the engine being operated differently in an ordinary control mode than in an exhaust temperature reduction mode, said traction control system comprising:

temperature detection means for detecting a temperature of said catalytic converter; and control means for changing an engine control mode from said ordinary control mode to said exhaust temperature reduction mode when said temperature detection means detects a temperature higher than a predetermined temperature and changing a control parameter of engine control, so that said engine provides more output torque in said exhaust temperature reduction mode than in said ordinary control mode.

2. A traction control system as defined in claim 1, wherein said control means increases said engine control parameter when the engine control mode is changed from said ordinary control mode to said exhaust temperature reduction mode.

3. A traction control system as defined in claim 1, wherein said control means causes an automatic transmission in said automotive vehicle to shift up when the engine control mode is changed from said ordinary control mode to said exhaust temperature reduction mode.

4. A traction control system as defined in claim 1, wherein said control means decreases a brake control parameter when the engine control mode is changed from said ordinary control mode to said exhaust temperature reduction mode.

5. A traction control system as defined in claim 1, wherein said temperature detection means detects an engine driving condition and estimates a temperature of said catalytic converter based on said engine driving condition.

6. A traction control system for an automotive vehicle for performing a traction control by controlling an engine equipped with an exhaust system having a catalytic converter so as to reduce driving force delivered to driving wheels, thereby diminishing excessive slippage of said driving wheels, the engine being operated differently in an ordinary control mode than in an exhaust temperature reduction mode, said traction control system comprising:

temperature detection means for detecting a temperature of said catalytic converter; and control means for changing an engine control mode from said ordinary control mode to said exhaust temperature reduction mode when said temperature detection means detects a temperature higher than a predetermined temperature and changing a control gain of engine control, so that said engine provides more output torque in said exhaust temperature reduction mode than in said ordinary control mode.

7. A traction control system as defined in claim 6, wherein said temperature detection means detects an engine driving condition and estimates a temperature of said catalytic converter based on said engine driving condition.

8. A traction control system for an automotive vehicle for performing a traction control by controlling an engine equipped with an exhaust system having a catalytic converter so as to reduce driving force delivered to driving wheels, thereby diminishing excessive slippage of said driving wheels, the engine being operated differently in an ordinary control mode than in an exhaust temperature reduction mode, said traction control system comprising:

temperature detection means for detecting a temperature of said catalytic converter; and control means for changing an engine control mode from said ordinary control mode to said exhaust temperature reduction mode when said temperature detection means detects a temperature higher than a predetermined temperature and changing a control parameter of engine control, so that said engine provides less output torque in said exhaust temperature reduction mode than in said ordinary control mode.

9. A traction control system as defined in claim 8, wherein said control means decreases said engine control parameter when the engine control mode is changed from said ordinary control mode to said exhaust temperature reduction mode.

10. A traction control system as defined in claim 8, wherein said temperature detection means detects an engine driving condition and estimates a temperature of said catalytic converter based on said engine driving condition.

11. A traction control system as defined in claim 5, wherein said temperature detection means detects a temperature of said engine and estimates a temperature of said catalytic converter based on said engine temperature and said control means controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said engine temperature is low than when said engine temperature is high.

12. A traction control system as defined in claim 5, wherein said temperature detection means detects a speed of said engine and estimates a temperature of said catalytic converter based on said engine speed and said control means controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said engine speed is high than when said engine speed is low.

13. A traction control system as defined in claim 5, wherein said temperature detection means detects an octane value of gasoline under usage and said control means selectively uses a first ignition timing map for gasoline having a high octane value in which ignition timings are defined according to engine driving conditions and a second ignition timing map for gasoline having a low octane value in which ignition timings are slightly retarded from those defined for the same engine driving conditions in said first ignition timing map, and said control means thereby controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said octane value is low than when said octane value is high.

14. A traction control system as defined in claim 7, wherein said temperature detection means detects a temperature of said engine and estimates a temperature of said catalytic converter based on said engine temperature and said control means controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said engine temperature is low than when said engine temperature is high.

15. A traction control system as defined in claim 7, wherein said temperature detection means detects a speed of said engine and estimates a temperature of said catalytic converter based on said engine speed and said control means controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said engine speed is high than when said engine speed is low.

16. A traction control system as defined in claim 7, wherein said temperature detection means detects an octane value of gasoline under usage and said control means selectively uses a first ignition timing map for gasoline having a high octane value in which ignition timings are defined according to engine driving conditions and a second ignition timing map for gasoline having a low octane value in which ignition timings are slightly retarded from those defined for the same engine driving conditions in said first ignition timing map, and said control means thereby controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said octane value is low than when said octane value is high.

17. A traction control system as defined in claim 10, wherein said temperature detection means detects a temperature of said engine and estimates a temperature of said catalytic converter based on said engine temperature and said control means controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said engine temperature is low than when said engine temperature is high.

18. A traction control system as defined in claim 10, wherein said temperature detection means detects a speed of said engine and estimates a temperature of said catalytic converter based on said engine speed and said control means controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said engine speed is high than when said engine speed is low.

19. A traction control system as defined in claim 10, wherein said temperature detection means detects an octane value of gasoline under usage and said control means selectively uses a first ignition timing map for gasoline having a high octane value in which ignition timings are defined according to engine driving conditions and a second ignition timing map for gasoline having a low octane value in which ignition timings are slightly retarded from those defined for the same engine driving conditions in said first ignition timing map, and said control means thereby controls said engine in a predetermined engine control pattern so as to reduce output torque of said engine according to slippage of said driving wheels and changes said engine control pattern so as to cause said engine to provide a larger reduction in the amount of unburned ingredients in an exhaust gas entering into said catalytic converter when said octane value is low than when said octane value is high.

20. A traction control system for an automotive vehicle for performing a traction control by controlling an engine equipped with an exhaust system having a catalytic converter so as to reduce driving force delivered to driving wheels, thereby diminishing excessive slippage of said driving wheels, the engine being operated differently in an ordinary control mode than in an exhaust temperature reduction mode, said traction control system comprising:

temperature detecting means for detecting a temperature of said catalytic converter; and control means for changing an engine control mode from said ordinary control mode to said exhaust temperature reduction mode when said temperature detecting means detects a temperature higher than a predetermined temperature and causing the engine to provide a drop in output torque smaller in said exhaust temperature reduction mode than in said ordinary control mode.

21. A traction control system as defined in claim 20, wherein said control means increases an engine control parameter when the engine control mode is changed from said ordinary control mode to said exhaust temperature reduction mode.

22. A traction control system as defined in claim 20, wherein said control means causes an automatic transmission in said automotive vehicle to shift up when the engine control mode is changed from said ordinary control mode to said exhaust temperature reduction mode.

23. A traction control system as defined in claim 20, wherein said control means decreases a brake control parameter when the engine control mode is changed from said ordinary control mode to said exhaust temperature reduction mode.

24. A traction control system as defined in claim 20, wherein said temperature detection means detects an engine driving condition and estimates a temperature of said catalytic converter based on said engine driving condition.

* * * * *